(12) United States Patent
Gilpin et al.

(10) Patent No.: US 11,730,285 B2
(45) Date of Patent: Aug. 22, 2023

(54) METHOD, SYSTEM AND APPARATUS FOR A RAIL TRACK

(71) Applicant: Omni Consumer Products, LLC, Addison, TX (US)

(72) Inventors: Marc A. Gilpin, Richardson, TX (US); Larry McNutt, Carrollton, TX (US)

(73) Assignee: Omni Consumer Products, LLC, Addison, TX (US)

( * ) Notice: Subject to any disclaimer, the term of this patent is extended or adjusted under 35 U.S.C. 154(b) by 784 days.

(21) Appl. No.: 16/846,204

(22) Filed: Apr. 10, 2020

(65) Prior Publication Data

US 2020/0323363 A1  Oct. 15, 2020

Related U.S. Application Data

(60) Provisional application No. 62/832,018, filed on Apr. 10, 2019.

(51) Int. Cl.
| | | |
|---|---|---|
| *A47F 5/00* | (2006.01) | |
| *F16B 2/06* | (2006.01) | |
| *H02J 7/00* | (2006.01) | |
| *F16B 2/12* | (2006.01) | |
| *H04N 7/18* | (2006.01) | |

(52) U.S. Cl.
CPC ............ *A47F 5/0018* (2013.01); *F16B 2/065* (2013.01); *F16B 2/12* (2013.01); *H02J 7/0042* (2013.01); *H04N 7/185* (2013.01)

(58) Field of Classification Search
CPC .. A47F 5/0018; A47F 2010/025; F16B 2/065; F16B 2/12; F16B 7/0413; F16B 7/182; H02J 7/0042; H04N 7/185; F21V 21/00; F21V 21/34; F21V 21/35; F21V 99/00
See application file for complete search history.

(56) References Cited

U.S. PATENT DOCUMENTS

| | | | | |
|---|---|---|---|---|
| 4,475,226 A | * | 10/1984 | Greenberg | ............... H04R 3/12 362/370 |
| 4,838,412 A | | 6/1989 | Backman | |
| 5,347,431 A | * | 9/1994 | Blackwell | .............. A61B 90/30 396/419 |
| 5,939,857 A | | 8/1999 | Madigan et al. | |

(Continued)

FOREIGN PATENT DOCUMENTS

| | | |
|---|---|---|
| CN | 204334006 | 5/2015 |
| JP | 2008-207691 | 9/2008 |

(Continued)

OTHER PUBLICATIONS

International Search Report and Written Opinion on PCT/US2020/027819 dated Jun. 22, 2020, 8 pages.

*Primary Examiner* — Bao Q Truong
(74) *Attorney, Agent, or Firm* — Foley & Lardner LLP

(57) ABSTRACT

A rail track assembly comprises a rail defining a longitudinal channel configured to slidably receive at least a portion of a monitoring drone. An end cap is configured to be coupled to a first longitudinal end of the rail. A charge cap is configured to be coupled to second longitudinal end of the rail opposite the first longitudinal end, the charge cap configured to house a power module for charging the monitoring drone when the monitoring drone is located at the second longitudinal end.

20 Claims, 16 Drawing Sheets

(56) References Cited

U.S. PATENT DOCUMENTS

| | | |
|---|---|---|
| 7,040,238 B2 | 5/2006 | Davis et al. |
| 9,923,341 B1 * | 3/2018 | Andersson ......... G06K 7/10732 |
| 2014/0361077 A1 | 12/2014 | Davidson |
| 2017/0317504 A1 * | 11/2017 | Hall .......................... H02J 4/00 |

FOREIGN PATENT DOCUMENTS

| | | |
|---|---|---|
| WO | WO-2016/062246 | 4/2016 |
| WO | WO-2019/032616 A1 | 2/2019 |

* cited by examiner

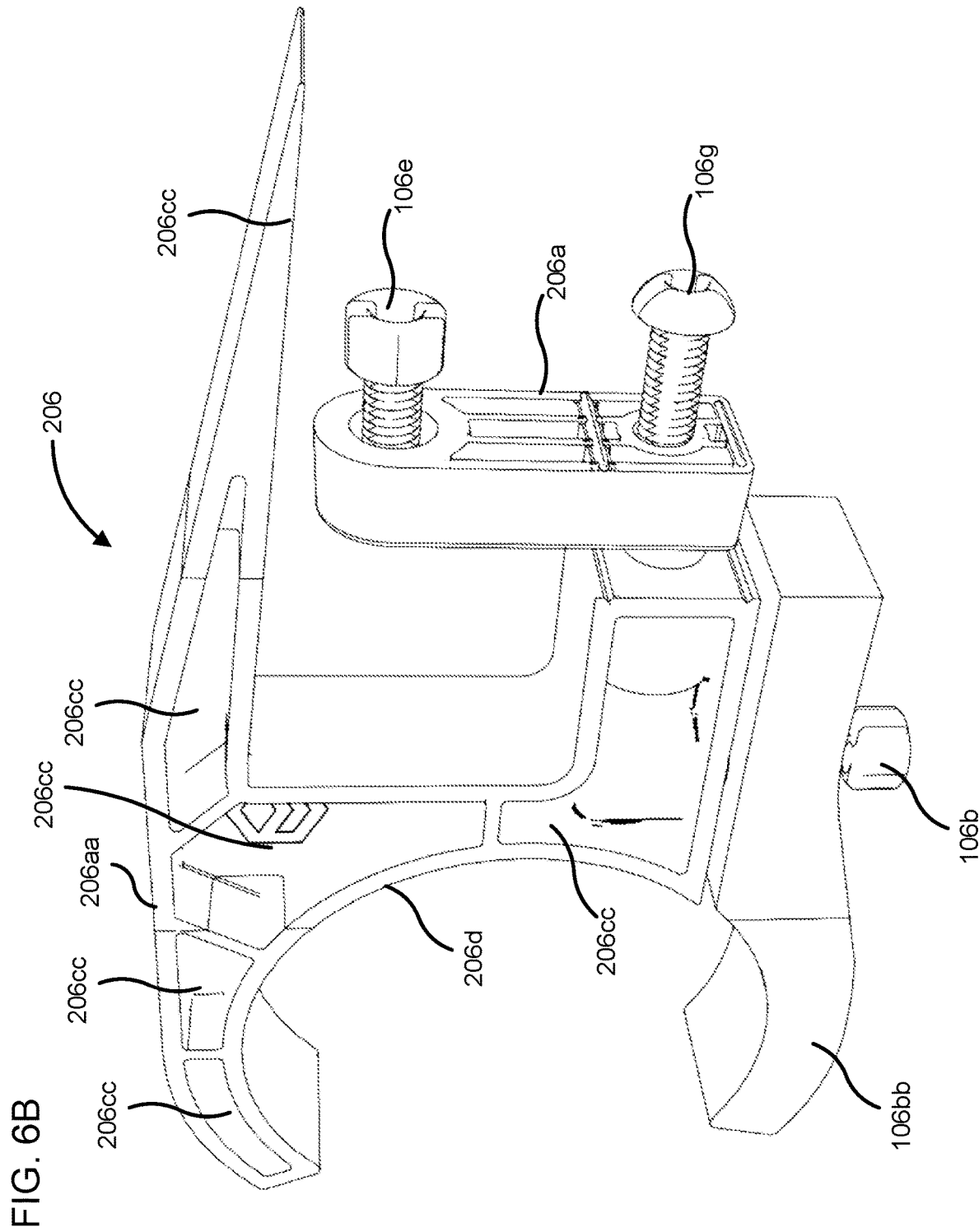

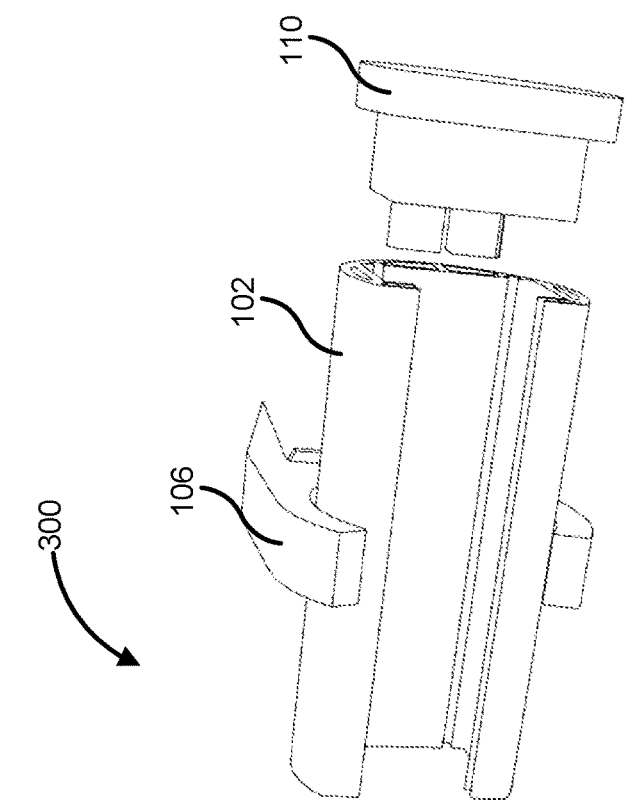
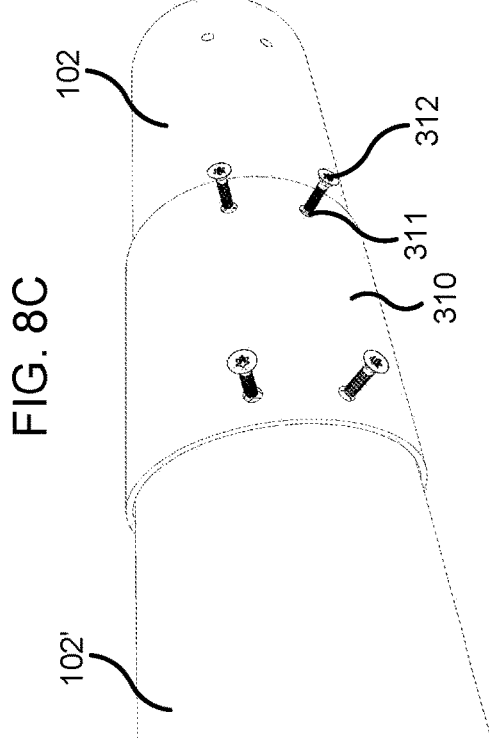
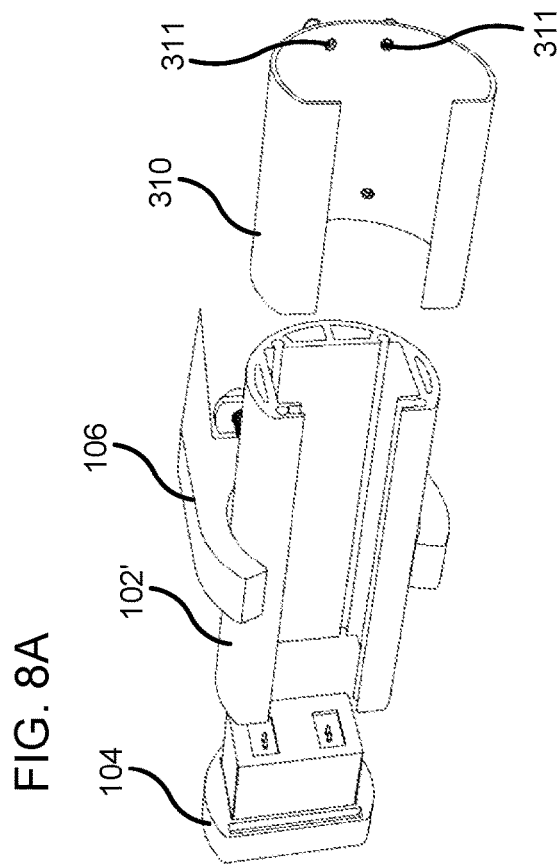
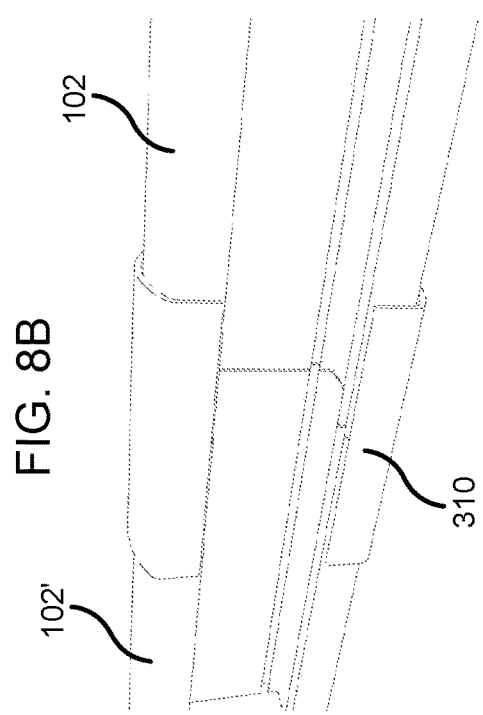

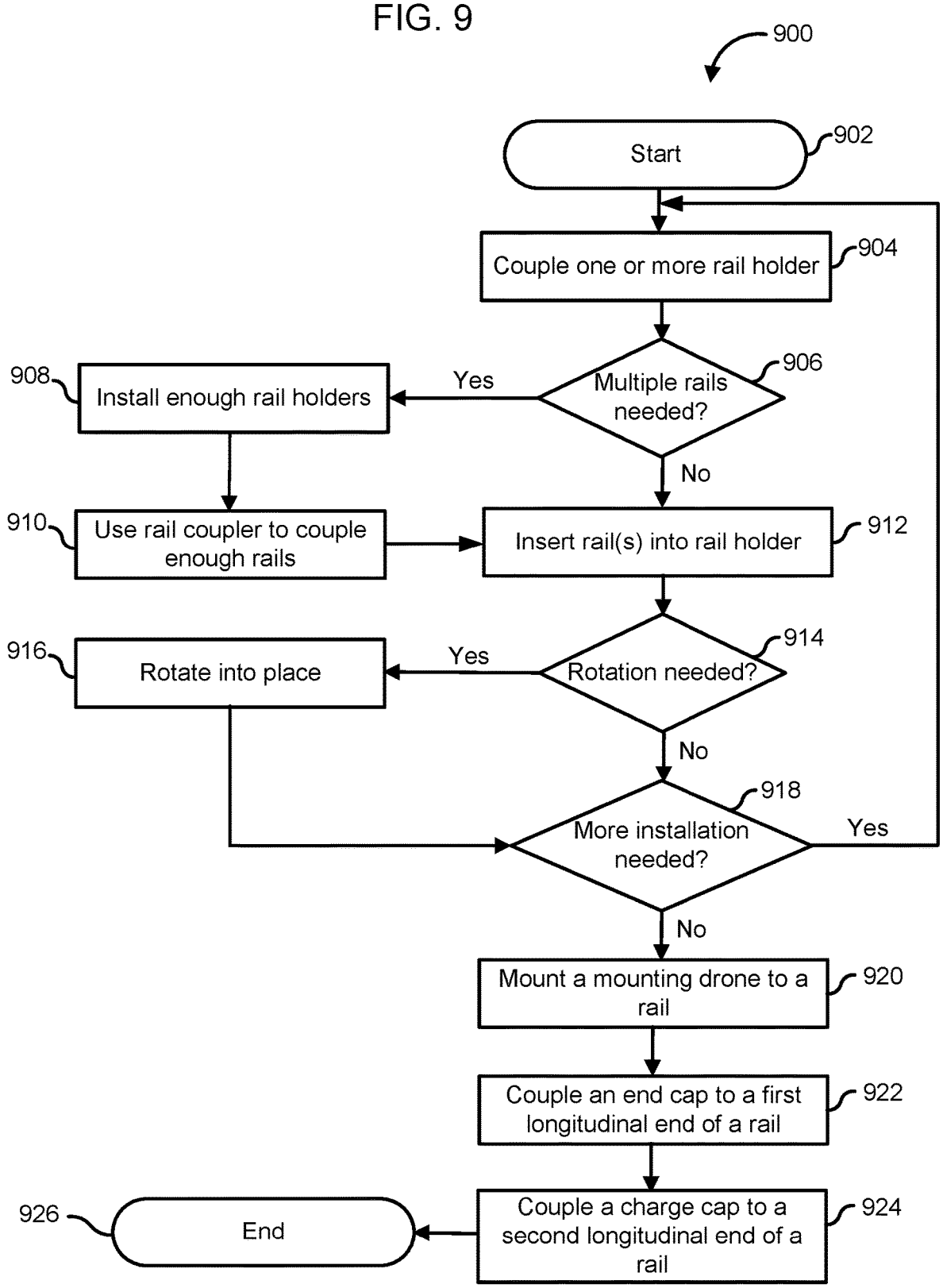

METHOD, SYSTEM AND APPARATUS FOR A
RAIL TRACK

CROSS-REFERENCE TO RELATED APPLICATIONS

The disclosure claims priority to and benefit of U.S. Provisional Appl. No. 62/832,018, filed Apr. 10, 2019, the entire disclosure of which is hereby incorporated by reference herein.

FIELD OF THE INVENTION

The disclosure relates to systems, apparatus and methods for a rail track. More specifically, this disclosure relates to components that couple together to form a rail track for mounting a monitoring drone and a method related to the installation of the rail track.

BACKGROUND

Rail tracks for robots tend to be labor intensive. At times, installing and creating such a rail track requires multiple tools and more than one person. As such, there is a need for a simplified rail track that can be installed and created quickly and efficiently utilizing only one person and one tool.

SUMMARY

Embodiments described herein relate to a method, apparatus and system for a rail track. According to some embodiments, the rail track includes a rail track, a rail, a rail holder, a charge cap, a rail coupler, and a cap.

In some embodiments, a rail track assembly comprises a rail defining a longitudinal channel configured to receive, slideably or otherwise, at least a portion of a monitoring drone. An end cap is configured to be coupled to a first longitudinal end of the rail. A charge cap is configured to be coupled to second longitudinal end of the rail opposite the first longitudinal end, the charge cap configured to house a power module for charging the monitoring drone when the monitoring drone is located at the second longitudinal end.

In some embodiments, a rail track system, comprises a first rail and a second rail, each of the first rail and the second rail defining a longitudinal channel configured to receive at least a portion of a monitoring drone. An end cap is configured to be coupled to a first longitudinal end of the first rail. A rail coupler is configured to couple a second longitudinal end of the first rail opposite the first longitudinal end to a first longitudinal end of the second rail, thereby coupling the first rail to the second rail. A charge cap is configured to be coupled to a second longitudinal end of the second rail opposite the first longitudinal end of the second rail, the charge cap configured to house a power module for charging the monitoring drone when the monitoring drone is located at the second longitudinal end of the second rail.

In some embodiments, a method for mounting a monitoring drone on a structure, comprises: coupling one or more rail holders to the structure, each of the one or more rail holders defining a receptacle. A rail is positioned in the receptacle of a corresponding rail holder of the one or more rail holders so as to couple a desired number of rails to the structure, each of the rails defining a longitudinal channel configured to slidably receive at least a portion of the monitoring drone. A monitoring drone is mounted on a rail of the desired number of rails. An end cap is coupled to a first longitudinal end of a first rail of the desired number of rails. A charge cap is coupled to a second longitudinal end of a last rail of the desired number of rails, the charge cap is configured to house a power module for charging the monitoring drone when the monitoring drone is located at the second longitudinal end of the last rail.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 6B is a back-side perspective view of the rail holder of FIG. 6A.

FIG. 8A is a front perspective view of a rail track system including a rail holder, according to another embodiment; FIG. 8B is a front perspective view of a portion of the rail track system showing the rail holder of FIG. 8A coupling a first rail to second rail; and FIG. 8C is a back view of the portion of the rail track system shown in FIG. 8B.

FIG. 9 is a schematic flow chart of an embodiment of a method for installing a rail track.

DETAILED DESCRIPTION

Figure 1:
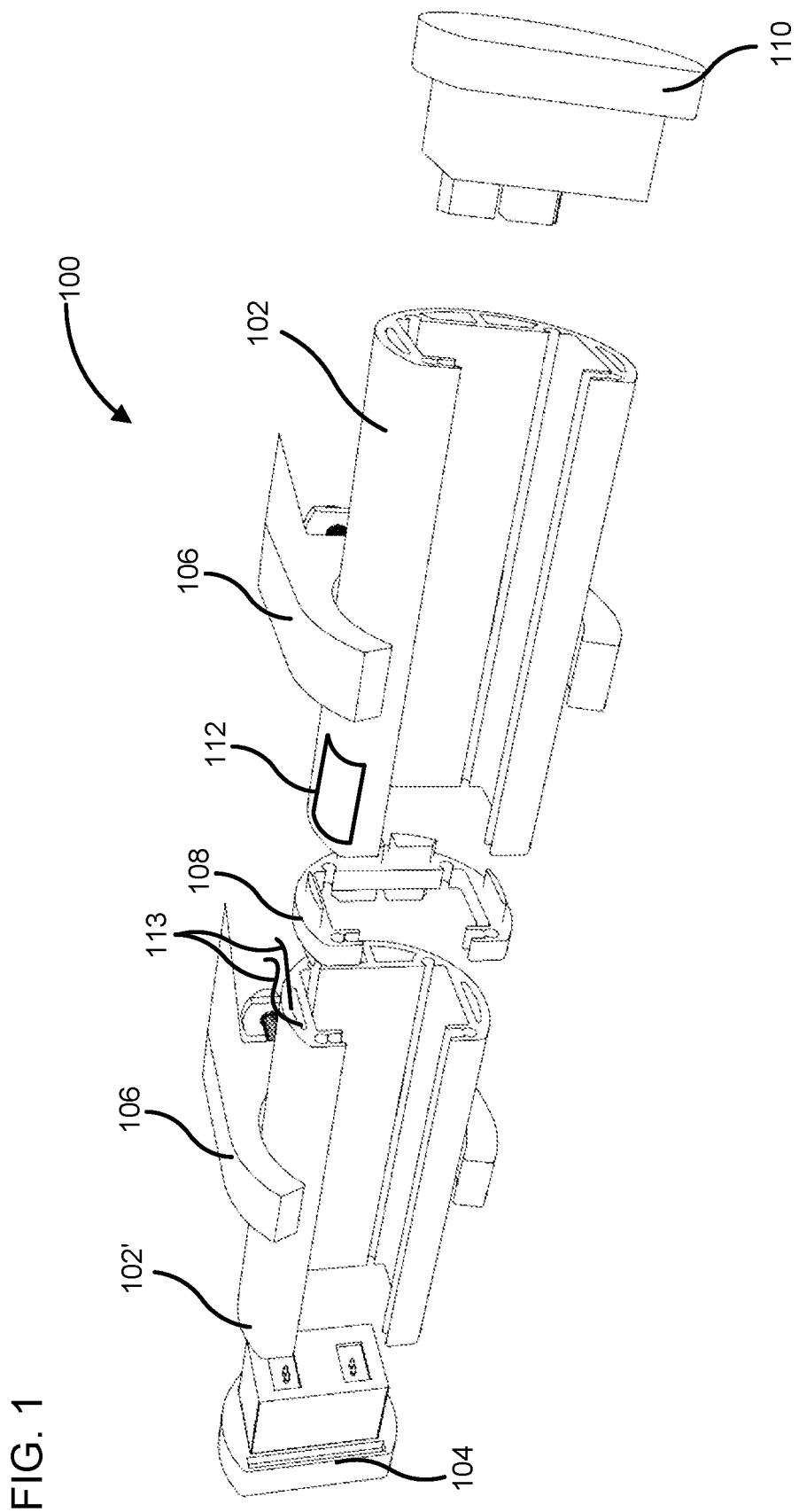
FIG. 1 is a front perspective view of a rail track system, according to an embodiment.

Embodiments described herein relate to a method, apparatus and system for a rail track. The rail track includes a rail track, a rail, a rail holder, a charge cap, a rail coupler, and a cap.

In the descriptions that follow, like parts are marked throughout the specification and drawings with the same numerals, respectively. The drawing figures are not necessarily drawn to scale and certain figures may be shown in exaggerated or generalized form in the interest of clarity and conciseness.

It will be appreciated by those skilled in the art that aspects of the present disclosure may be illustrated and described herein in any of a number of patentable classes or context including any new and useful process, machine, manufacture, or composition of matter, or any new and useful improvement thereof. Therefore, aspects of the present disclosure may be implemented entirely in hardware or combining software and hardware implementation that may all generally be referred to herein as a "circuit," "module," "component," or "system" (including firmware, resident software, micro-code, etc.). Further, aspects of the present disclosure may take the form of a computer program product embodied in one or more computer readable media having computer readable program code embodied thereon.

Aspects of the present disclosure are described herein with reference to flowchart illustrations and/or block diagrams of methods, systems and computer program products according to embodiments of the disclosure. It will be understood that each block of the flowchart illustrations may be done in the same order of different order and that not all steps are required in every instance.

Embodiments of the systems and methods described herein may provide one or more benefits including, for example: 1) allowing mounting of monitoring drones on any suitable structure, for example, a top, middle, or bottom shelf of a grocery store, thereby providing flexibility in inventory monitoring/management; 2) allowing coupling of any number of rails in series with each other so as to be compatible with a shelf or structure having any length; 3) allowing rotation of the rails within a rail holder during installation, thereby facilitating proper orientation and alignment of the rails and the mounting drone; 4) enabling charging of the mounting drone mounted on the track system during operation without having to remove the mounting drone from the rail track system; and 5) providing rapid and real time inventory monitoring of items on a shelf without interfering with customer experience.

Figure 2:
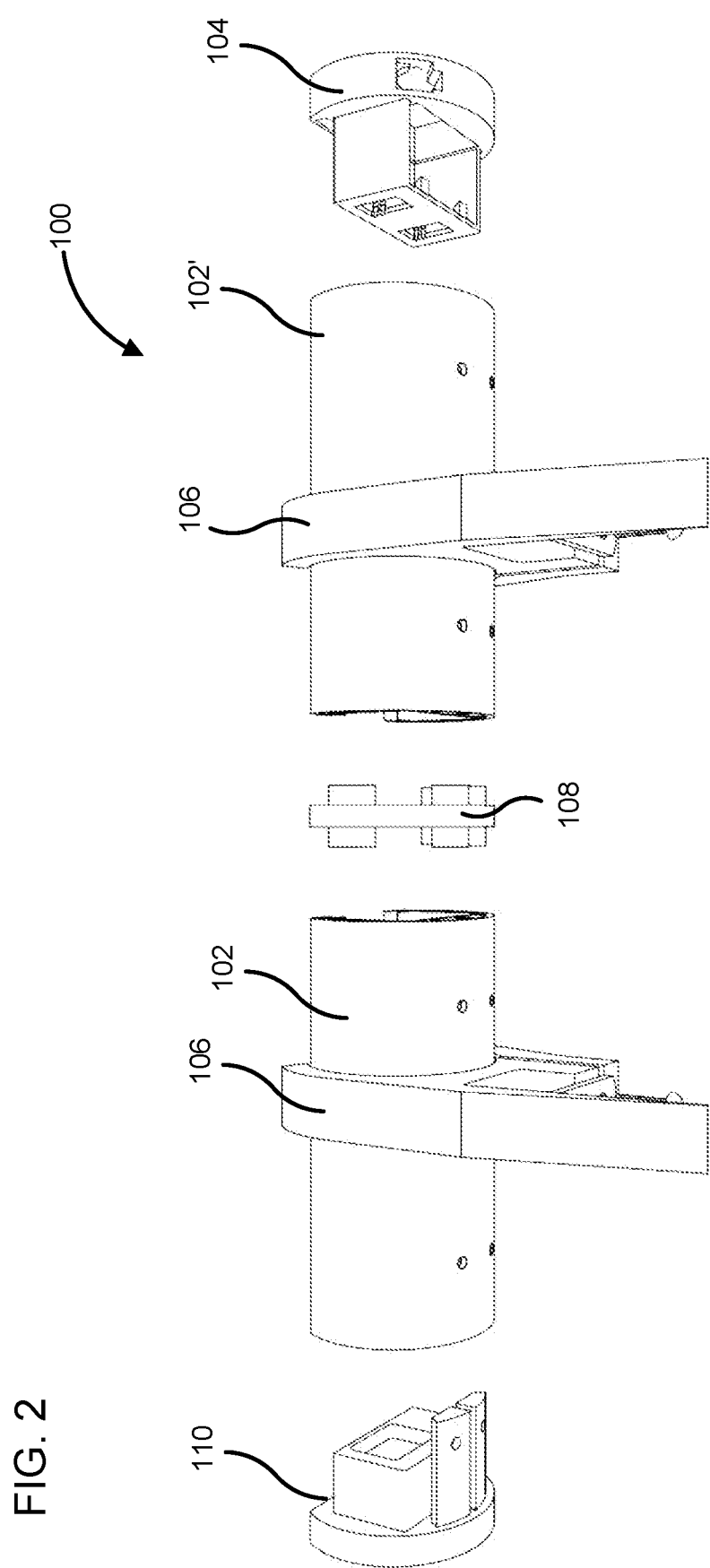
FIG. 2 is a top view of the rail track system of FIG. 1.

FIG. 1 is a diagram illustrating an embodiment of a front perspective view for a rail track system 100. FIG. 2 is a diagram illustrating an embodiment of a top view of the rail track 100. The rail track 100 includes a first rail 102 and a second rail 102', a charge cap 104, a rail holder 106, a rail coupler 108, and an end cap 110. The rail track system 100 is configured to slidably mount a monitoring drone, for example, the monitoring drone 114 shown in FIG. 3 or the monitoring drone 1000 shown in FIG. 10, such that the monitoring drone can move along the rails 102, 102' and collect desired information at different locations along the path of the drone (e.g., images of inventory on a retail shelf).

In some embodiments, the rail track 100 may also utilize solar panels 112 and wires 113 to provide charge to a power module in the charge cap 104 for selectively charging the drone 114, as described in further detail herein. In this embodiment, the charge cap 104 is shown to plug the second rail 102'. In other embodiments, an end cap 110 may replace the charge cap 104 and a charge maybe provided through a module embedded in the rails 102, 102', rail coupler 108, or rail holder 106. In one embodiment, the rail track system 100 may be utilized to facilitate movement and/or be utilized by a monitoring drone 114.

Figure 3:
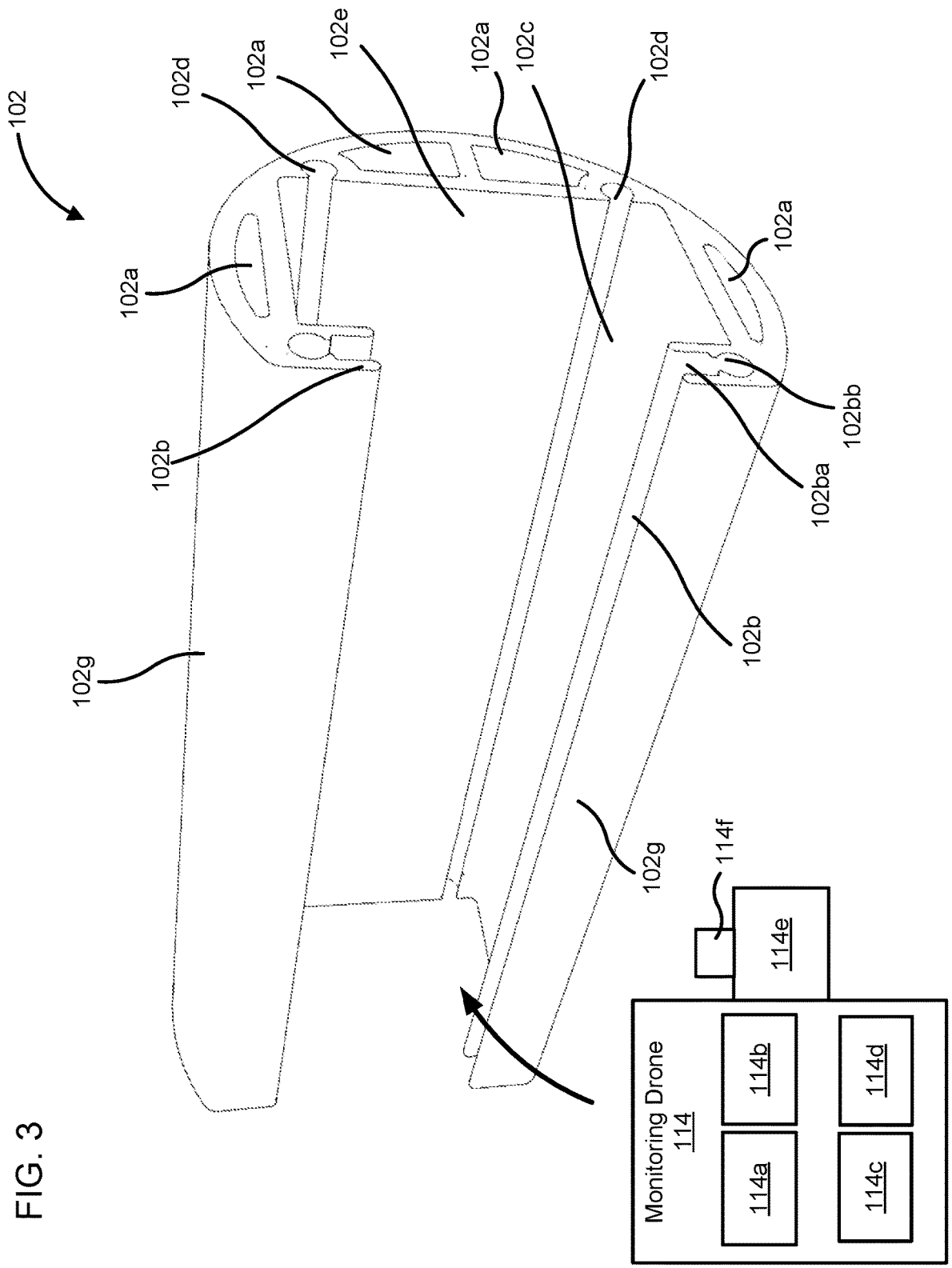
FIG. 3 is a front perspective view of an embodiment of a rail included in the system of FIG. 1.

FIG. 3 is a diagram illustrating an embodiment of the first rail 102 and a block diagram of the monitoring drone 114 that may be mounted on the first rail 102. In some embodiments, the monitoring drone 114 may include an image capture device 114a (e.g., an optical or solid state camera) to capture images of inventory on a shelf or of items on any other structure to which the rail track system 100 is coupled. The monitoring drone 114 may also include a rechargeable power source 114b that powers the various components of the monitoring drone 114. In some embodiments, the monitoring drone 142 may include a light source 114c (e.g., an LED light, a flash, etc.) for optically illuminating various items on the shelf. In some embodiments, the image capture device 114a may be capable of night vision.

In some embodiments, the monitoring drone 114 may include a defogger 114d configured to heat or otherwise defog a surface of the image capture device 114a or the light source 114c, for example, to remove any moisture that may condense thereon. The defogger 114d may include for example, thin strips or coils of electrical conducting material disposed on the image capture device 114a that generate heat in response to an electrical current being passed therethrough. The monitoring drone 114 includes a rail mount structure 114e configured to be mounted on corresponding tracks 102b (FIG. 3) of the rails 102, 102' so as to allow the monitoring drone 114 to slide along the track 102b. The rail mount structure 114e may include, for example, wheels or arms that slide into the tracks 102b that can polarized for magnetic levitation and movement of the monitoring drone 114. The monitoring drone 114 also defines a charging port 114f configured to receive charging arms 105a and a charging pin 105b of the charge cap 104 which allows the monitoring drone 114 to be charged.

While FIGS. 1-2 shows the rail track system 100 as including the first rail 102 and the second rail 102', it should be understood that the rail track system 100 may include any number of rails 102. The rails 102 may be made of any material, such as, 3D print materials, aluminum, casting material, aluminum extrusion; and the like. The first rail 102 defines a longitudinal channel 102c configured to slidably receive at least a portion of the monitoring drone 114 or any other monitoring drone described herein (e.g., the monitoring drone 1000). The longitudinal channel 102c may have a rectangular cross-section as shown in FIG. 3, but in other embodiments, may have a square, circular, elliptical, or any other suitable cross-section. Moreover, the first rail 102 may have be straight, bent, curved, or have any suitable curvature along its length. The second rail 102' may be substantially similar in structure and function to the first rail 102, but may have a different length than the first rail 102.

In this embodiment shown in FIGS. 1-3, the first rail 102 includes an outer wall 102g that is shown to have an outer perimetral shape that is C-shaped to facilitate the rotation of the first rail 102 in the rail holder 106. A plurality of slots 102a are defined at a first longitudinal end and the second longitudinal end of the first rail 102. The slots 102a are sized and otherwise positioned to receive corresponding charge cap tabs 104c of the charge cap 104, rail coupler tabs 108c of the rail coupler 108, or end cap tabs 110c of the end cap 110, as described in further detail herein, for example, to facilitate the coupling of the first rail 102 to the second rail 102' directly or via the rail coupler 108. In other embodiments, the slots 102a may serve as a conduit like structure to be used to stretch electric or communications wires across the first rail 102. The first rail 102 may also include tracks 102b. Tracks 102b may be on any location within the first rail 102. In the embodiment shown in FIG. 3, two tracks 102*b* are shown, one on the top and one of the bottom. Any number of tracks 102*b* may be included, which may be the same size and/or shape or may vary in size and/or shape. In some embodiments, the first rail 102 accommodates one or more drone or robot (e.g., the monitoring drone 114, 1000).

Expanding further, the first rail 102 defines at least one track 102*b* extending along a longitudinal length of the first rail 102 and configured to slidably mount the monitoring drone 114. In some embodiments, the track 102*b* may include a track first portion 102*ba* defining a rectangular cross-section, and a track second portion 102*bb* defining a circular cross-section. In such embodiments, the rail mount structure 114*e* may define a corresponding shape for sliding into the track 102*b* similar to a lock and key mechanism. Such a shape of the track 102*b* may facilitate alignment of the rail mount structure 114*e* of the monitoring drone 114 to with the track 102*b*, and reduce lateral movement. In some embodiments, axial notches 102*d* may be defined on edges of a back wall 102*e* of the rail 102 along the axial length of the rail 102. In some embodiments, the notches 102*d* may serve as tracks to receive a portion of rail mount structure 114*e* of the drone 114. In other embodiments, the notches 102*d* may facilitate bending of side walls 102*g* of the rail 102, which extend in a transverse direction from opposite edge of the back wall 102*a*, towards or away from each other, for example, to facilitate mounting of the rails 102, 102' on the rail holder 106, or mounting of the drone 114 onto the tracks 102*b*.

Figure 4:
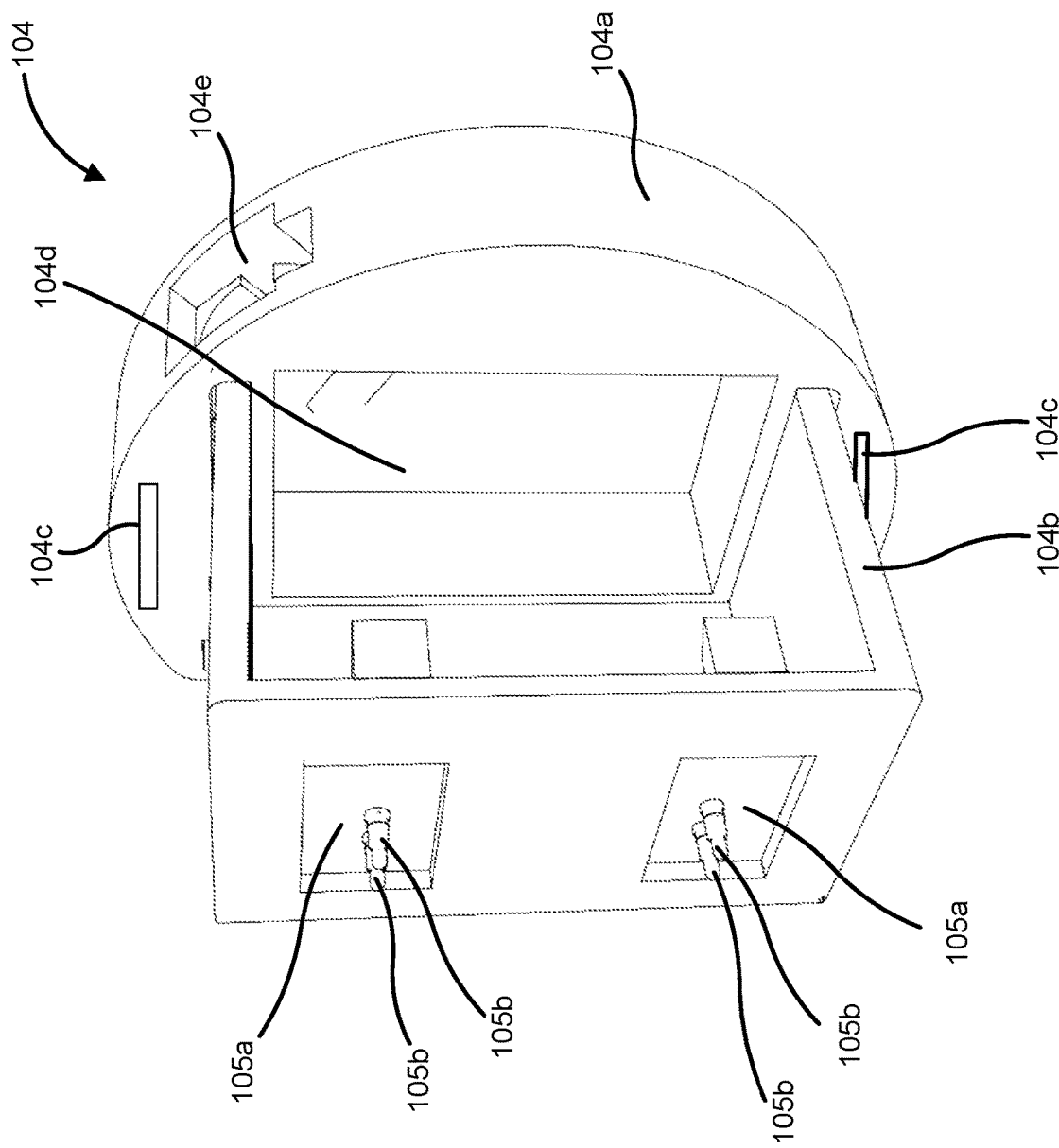
FIG. 4 is a side perspective view of an embodiment of a charge cap included in the system of FIG. 1.

FIG. 4 is a side perspective view of an embodiment of the charge cap 104 included in the rail track system 100 of FIGS. 1-2. In one embodiment, the charge cap 104 houses a power module (not shown), for example, a rechargeable battery, a voltage transformer, charging electronics, etc. The power module maybe utilized to power/maintain power to one or more device(s) utilizing the rail track. The power module is usually a low power module and might be charged wired or wireless. In one embodiment, the power module may utilize one or a combination of the following electric wire, battery, WIFI charging, coil, solar cells, or any other mechanism that provides charge.

As shown in FIGS. 1-2, the charge cap 104 is configured to be coupled to second longitudinal end of the second rail 102' or a last rail in in a series of rails, which is opposite a first longitudinal end of the first rail 102 or a first rail in the series of rails to which the end cap 110 is coupled. The charge cap 104 is configured to charge the monitoring drone 114 via the power module when the monitoring drone 114 is located at the second longitudinal end.

In some embodiments, the charge cap 104 includes a charge cap main body 104*a* configured to abut an end face of the second longitudinal end of the second rail 102' when the charge cap 104 is coupled to the second rail 102'. A power module housing 104*b* extends from the charge cap main body 104*a* into the longitudinal channel 102*c* defined by the second rail 102'. The power module housing 104*b* defines an internal volume 104*c* configured to house the power module. In some embodiments, the charge cap 104 may include a plurality of charge cap tabs 104*c* extending from the charge cap main body 104*a*, for example, from portions of the charge cap main body 104*a* that extends radially away from power module housing 104*b* into the longitudinal channel 102*c* defined by the second rail 102'. Each of the plurality of charge cap tabs 104*c* are configured to be inserted into a corresponding slot 102*a* of the plurality of slots 102*a* of the corresponding rail 102' for coupling the charge cap 104 to the second longitudinal end of the second rail 102'. In other embodiments, the charge cap 104 may be coupled to the first rail 102.

As shown in FIG. 4 the charge cap 104 includes a pair of charging portions 105*a* defined on a sidewall of the power module housing 104*d* that is inserted into the second rail 102' and is orthogonal to a longitudinal axis of the second rail 102'. While shown as including two charging portions 105*a*, in other embodiments, the charge cap 104 may include one, or more than two charging portions 105*a*. Each of the charging portions 105*a* include at least one charging pin 105*b* (e.g., two charging pins as shown in FIG. 4 but may include more) protruding therefrom into the longitudinal channel 102*c*. The at least one charging pin 105*b* is configured to contact a charging port 114*f* of the monitoring drone 114, for example, corresponding electrical contacts present in the charging port 114*f* so as to charge the monitoring drone 114. In some embodiments, a power socket 104*e* may be defined in the charge cap 104 that is configured to receive an electrical lead that provides electrical power to the power module included in the charge cap 104. In other embodiments, the charge cap 104 may include charging arms extending from an end of the power module housing 104*b* into the longitudinal channel 102*c*. The charging arms are configured to secure a charging pin, for example, between the two charging arms, and configured to interface with the drone 114 to facilitate positioning of the charging pin 105*b* relative to the charging port 114*f* of the drone 114.

Figure 5A:
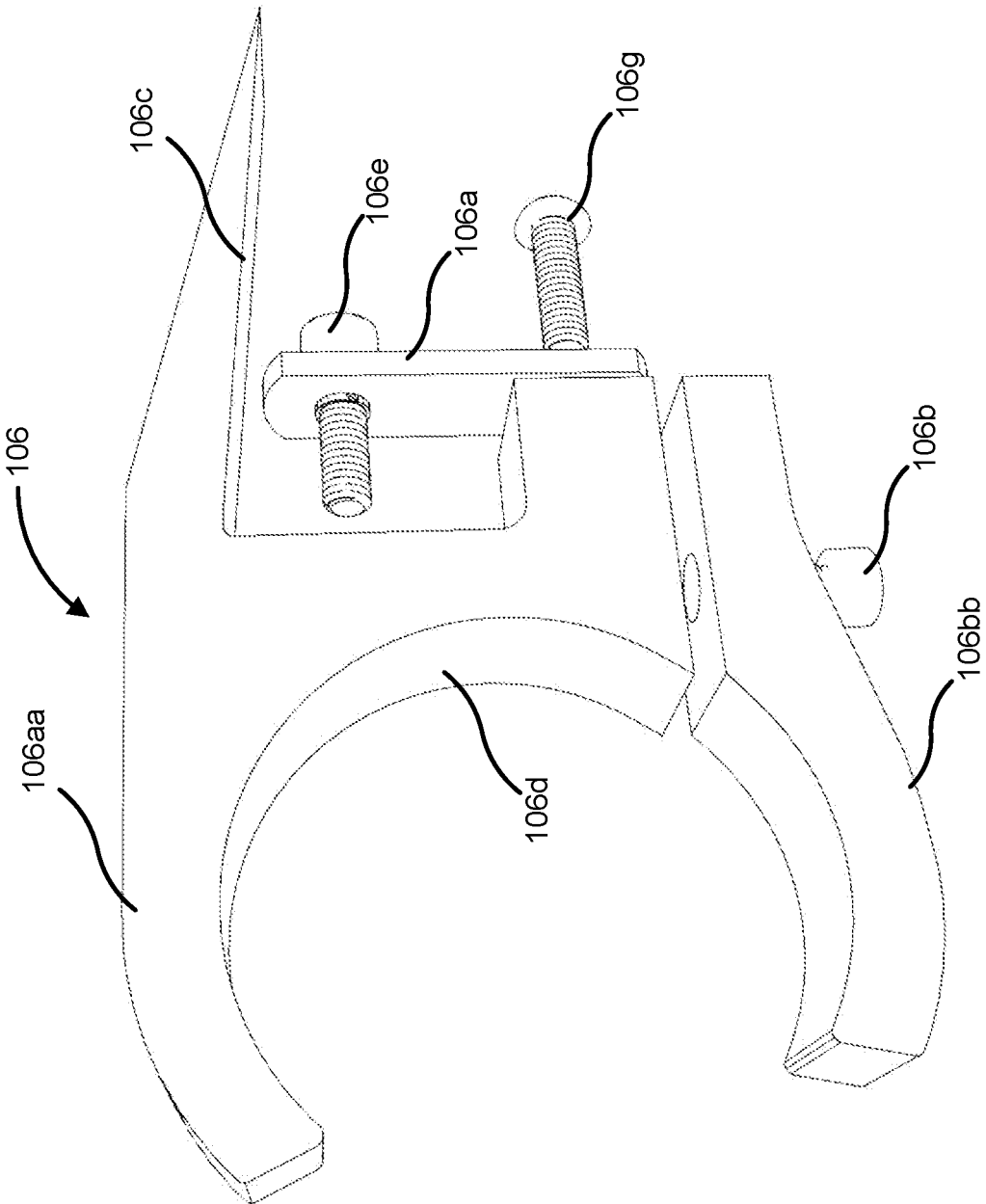
FIG. 5A is a front-side perspective view of an embodiment of a rail holder included in the system of FIG. 1.
Figure 5B:
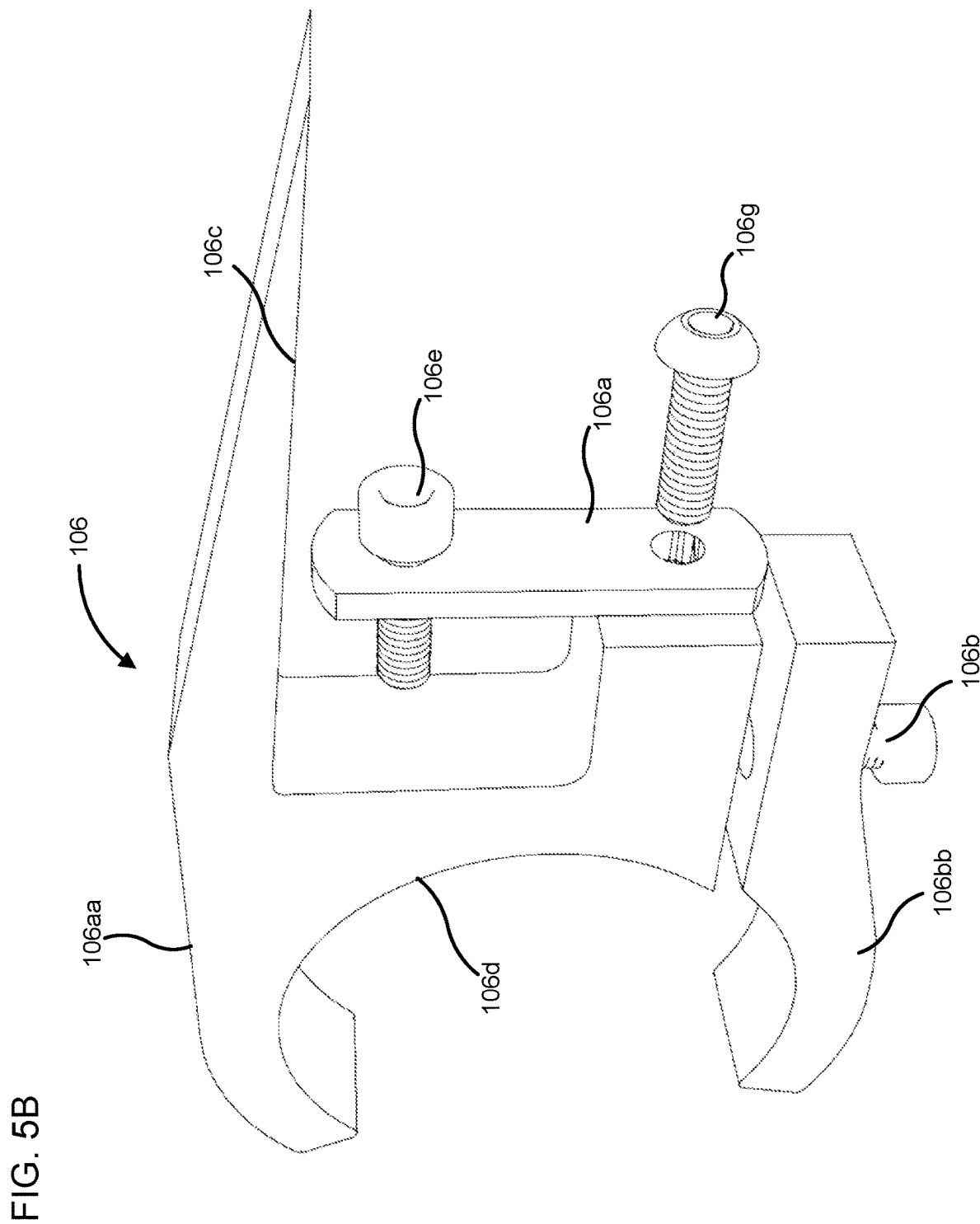
FIG. 5B is a back-side perspective view of the rail holder of FIG. 5A.

Referring to FIGS. 5A-5B, the rail holder 106 holds the first rail 102, 102' and accommodates the shapes of the first or second rail 102. Another rail holder 106 holds the second rail 102'. While FIGS. 1-2 show one rail holder 106 holding the first rail 102 and another rail holder 106 holding the second rail 102', a plurality of rail holders 106 may be used to hold the first rail 102, the second rail 102' or any other rail included in the rail track system 100.

The rail holder 106 includes a rail holder first portion 106*aa* and a rail holder second portion 106*aa* that when coupled together define a receptacle 106*d* configured to hold the first rail 102. The rail holder 106 is configured to be coupled to a structure (e.g., a shelf in retail store) to secure the first rail 102 to the structure. In some embodiments, the receptacle 106*d* defines a perimetral shape that corresponds to or matches an outer perimetral shape of the first rail 102. For example, as shown in FIGS. 1-3 and 5A-5B, the each of the perimetral shape of the receptacle 106*d* and the outer perimetral shape of the first rail 102 include a C-shape. The C-shaped receptacle 106*d* and the first rail 102 may facilitate rotation of the first rail 102 (or the second rail 102') within the receptacle 106*d* so as to allow position of the first rail 102 within the receptacle 106*d* in a desired orientation.

In one embodiment, the rail holder 106 includes a track coupler 106*a* to facilitate coupling the rail holder 106 to a device, edge, shelf, or the like. The track coupler 106*a* includes a tightening mechanism 106*e* (e.g., a screw or bolt) to ensure proper coupling of the track coupler 106*a* to the structure (e.g., a shelf). The track coupler 106*a* may be coupled to a body of the rail holder 106 via a securing mechanism 106*g*. The rail holder 106 may also include a coupling member 106*b* (e.g., a screw or bolt) configured to couple the rail holder first portion 106*aa* to the rail holder second portion 106*bb*. For positioning the rail 102 or 102' into the rail holder 106, the coupling member 106*b* may be loosened to move the rail holder second portion 106*bb* distal from the rail holder first portion 106*aa*. Once the rail 102 or 102' is positioned in the receptacle 106*d*, the coupling member 106*b* is tightened to move the rail holder second portion 106*bb* towards the rail holder first portion 106*aa* until the rail 102 or 102' is clamped or secured therebetween. In some embodiments, the rail holder 106 has a flat end 106*c* to ensure proper alignment to a shelf, edge, device and the likes. Each of the tightening mechanism 106*e*, the securing mechanism 106*g*, and the set screw may be configured to be loosened or tightened using the same tool.

Figure 6A:
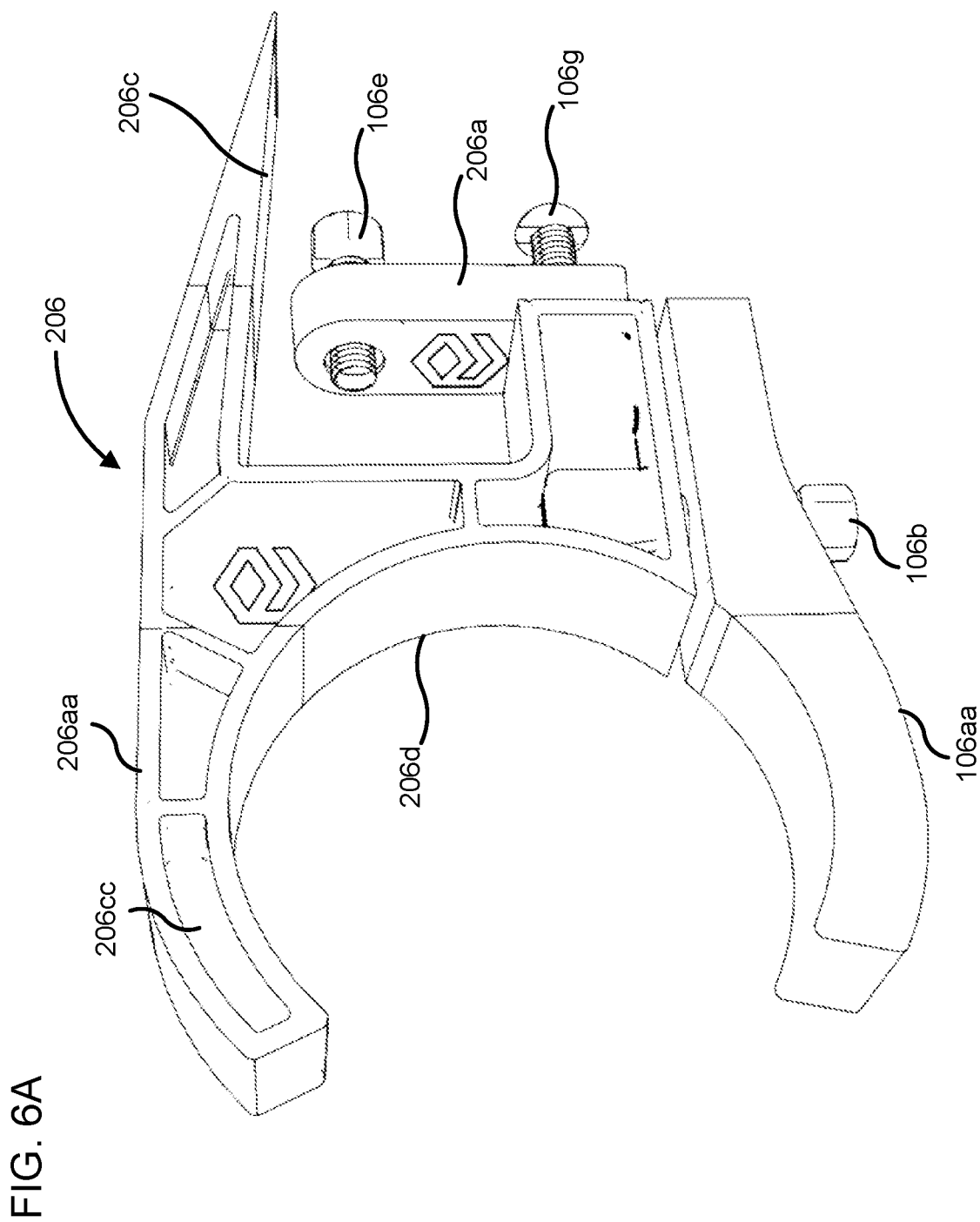
FIG. 6A is a front-side perspective view of another embodiment of a rail holder.

Referring to FIGS. 6A-6B, another embodiment of a rail holder 206 is shown. The rail holder 206 is substantially similar to the rail holder 106 and includes the rail holder second portion 106*bb*, the coupling member 106*b* and the tightening mechanism 106*e* and the securing mechanism 106*g*. However, different from the rail holder 106, the rail holder 206 includes a rail holder first portion 206*aa* that forms a portion of a receptacle 206*d* in combination with the rail holder second portion 106*bb*, and includes a flat end 206*c*. The rail holder first portion 206*aa* is similar in shape to the rail holder first portion 106*aa* but defines a plurality of slots 206*cc* therethrough at predetermined locations. In other embodiments, the plurality of slots 206*cc* may be replaced with cavities. The plurality of slots 206*cc* or cavities may reduce the overall weight of the rail holder 206 while providing mechanical strength. Moreover, the rail holder 206 includes a track coupler 206*a* that is thicker than the rail holder 106*a* such that it has higher mechanical strength, is easier to handle, and has longer life.

Figure 7A:
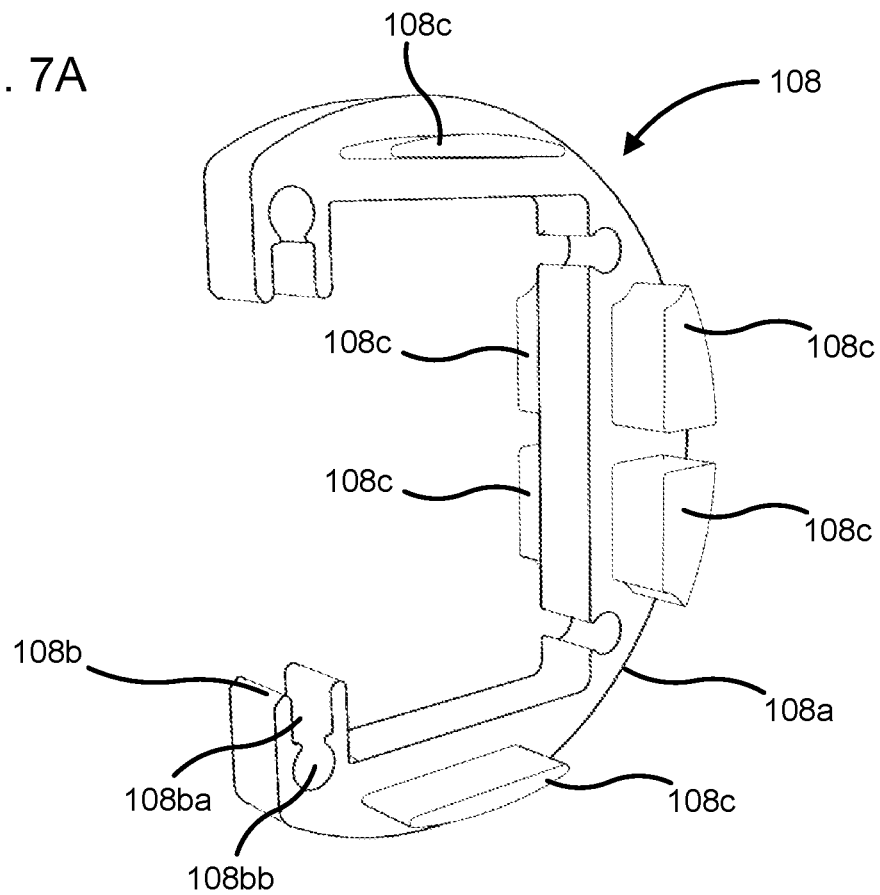
FIG. 7A is a front-side perspective view of an embodiment of a rail coupler included in the system of FIG. 1.

FIG. 7A is a front-side perspective view of the rail coupler 108. While FIG. 7A shows a particular rail coupler 108, any other suitable rail coupler may be utilized (e.g., the rail coupler 310 shown in FIGS. 8A-8C). The rail coupler 108 is configured to axially coupled the first rail 102 or to the second rail 102'. For example, the rail coupler 108 may be coupled to a second longitudinal end of the first rail 102 opposite the first longitudinal end on which the end cap 110 is installed, and coupled to a first longitudinal end of the second rail 102' of the rail track system 100 as shown in FIGS. 1-2, thereby coupling the first rail 102 to the second rail 102'.

As shown in FIG. 7A, the rail coupler 108 includes a rail coupler main body 108*a* having a shape that matches the shape of the rails 102, 102'. A plurality of rail coupler tabs 108*c* extend axially from either sides of the rail coupler main body 108*a* and are configured to be inserted into corresponding slots 102*a* of the first rail 102 and the second rail 102' so as to couple the rails 102, 102' to each other (e.g., via a friction fit or snap fit mechanism). The rail coupler 108 also defines a rail coupler track 108*b* including a rail coupler track first portion 108*ba* that matches the cross-sectional shape and size of the track first portion 102*ba*, and a rail coupler track second portion 108*bb* that matches the cross-sectional shape and size of the track second portion 102*bb*. Thus, the monitoring drone 114 can easily travel between the track 102*b* of the first rail 102 and track 102*b* of the second rail 102' via the rail coupler track 108*b*.

In one embodiment, the coupling of the rails 102, 102' may be enforced by a sleeve like device that encompasses the rail coupler 108, at least a portion of the first rail 102 and at least a portion of the second rail 102', as shown in FIGS. 8A-8C. In another embodiment, sleeve may also be used as a coupling mechanism to suspend the first rail 102 and the second rail 102'. For example, FIGS. 8A-8C show a rail track system 300 including a rail coupler 310. Different from the rail coupler 110, the rail coupler 310 includes a sleeve that has a shape that corresponds to the outer perimetral shape of the rails 102, 102'. However, the rail coupler 310 has larger cross-sectional width than the rails 102, 102' such that at least a portion of the first rail 102 (e.g., its second longitudinal end) and the second rail 102' (e.g., its first longitudinal end) can be inserted into a longitudinal channel defined by the rail coupler 310, for example, until the second longitudinal end of the first rail 102 abuts the first longitudinal end of the second rail 102'. A plurality of apertures 311 are defined in a wall of the rail coupler 310 through which screws 312 or any other securing member (e.g., set screws, bolts, etc.) can be inserted for securing the encompassed portions of the rails 102, 102' within the rail coupler 310.

Figure 7B:
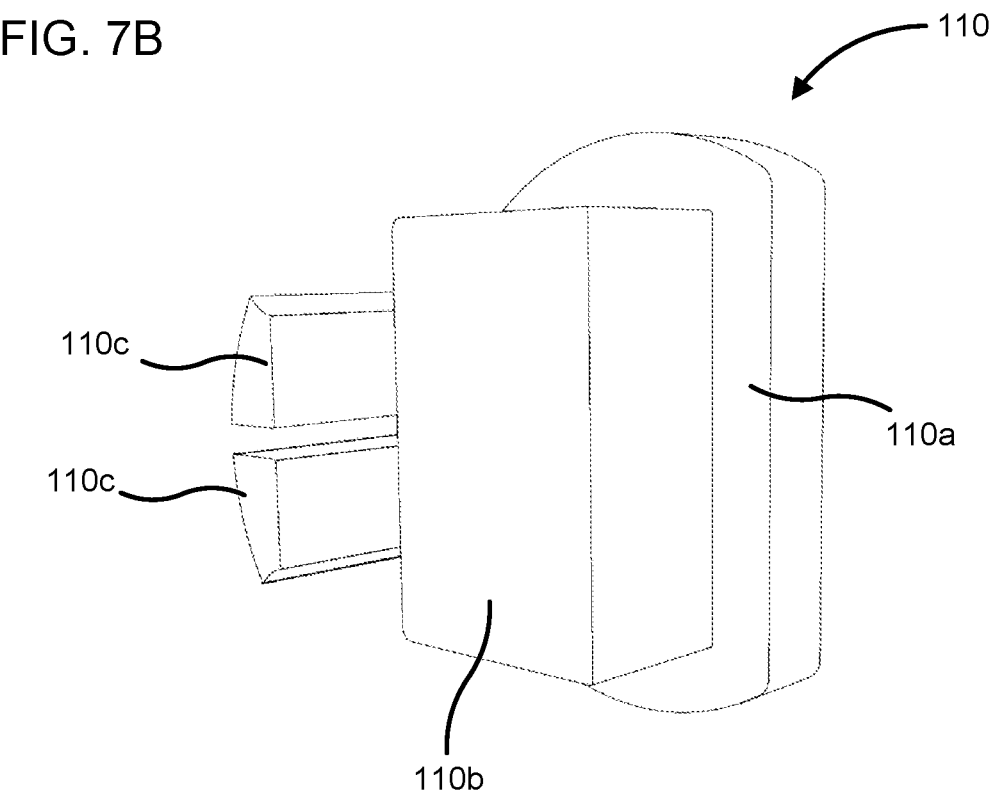
FIG. 7B is a side perspective view of an embodiment of an end cap included in the system of FIG. 1.

FIG. 7B is side perspective view of an embodiment of the end cap 110. The end cap 110 is configured to be coupled to a first longitudinal end of the first rail 102. In other embodiments, the end cap 110 may be coupled to a second longitudinal end of the second rail 102'. As shown in FIG. 7B, the end cap 110 includes an end cap main body 110*a* that may have a shape that substantially matches the cross-sectional shape of first rail 102. A plurality of end cap tabs 110*c* extend from an outer perimeter of the end cap main body 110*a* towards the first rail 110*a*. Each of the plurality of end cap tabs 110*c* is configured to be inserted into a corresponding slot 102*a* of the plurality of slots 102*a* of the first rail 102 for coupling the end cap 110 to the first longitudinal end of the first rail 102. In some embodiments, the end cap 110 may also define a plug 110*b* that extends from the end cap main body 110*a* into the longitudinal channel 102*c* defined by the first rail 102. The plug 110 may have shape corresponding to the shape of the channel 102*c* and serve as a motion limiter for the monitoring drone 114, for example, to prevent the monitoring drone 114 from traveling to the very end of the track 102*b*.

FIG. 9 is a schematic flow chart of an embodiment of a method 900 for installing a rail track system (e.g., the rail track system 100) on a structure, for example, a shelf in a retail store or a warehouse. While described with respect to the rail track system 100, it should be understood that the method 900 may be used with any other rail track system.

The method 900 starts at 902, and at step 904, one or more rail holders 106 are coupled to a structure (e.g., a retail store or ware house shelf). At step 906, it is determined whether multiple rails 102 are needed for mounting to the structure. In response to determining that multiple rails 102 are not needed (906:NO), the method 900 proceeds to step 912, and a rail 102 is inserted into the one or more rail holders 106. However, if it is determined that multiple rails 102 are needed (906:YES), for example, for the rail track system 100 to cover an entire length of the structure, the method 900 proceeds to step 908 and enough or sufficient rail holders 106 are installed on the structure as needed. At step 910, rail couplers 108 are used to couple enough or sufficient rails 102 as needed to each other, as previously described herein, and at step 912, the enough or sufficient rails 102 are coupled to the plurality of rail holders 106 that have been coupled to the structure.

At step 914, the method 900 determines if rotation of one or more of the rails 102 is needed, for example, to align the rails 102 to each other or orient them properly with respect to the structure (e.g., in an optimal direction for the monitoring drone 114, 1000 to monitor the inventory on a shelf to which the rails 102 are mounted). If rotation is required (914:YES), the one or more rails 102 are rotated into place, at step 916. If no rotation is required (914:NO) or after the rails 102 have been rotated into place at step 916, the method 900 determines if more rail holders 106 and rails 102 are needed, at step 918. If more installation is needed (918:YES), the method 900 returns to step 904 and more rail holders 106 and rails 102 are installed.

On the other hand if more installation is not needed (918:NO), a monitoring drone (e.g., the monitoring drone 114, 1000) is mounted to the one or more rails 102, at step 920. For example, the drone may be mounted on a track of the first or last rail 102 of the plurality of rails 102 that are coupled to each other and mounted on the shelf via the rail holders 106. At step 922, the end cap 110 is coupled to a first longitudinal end of a first rail 102 in the plurality of rails 102 (e.g., the first rail 102). At step 924, the charge cap 104 is coupled to a second longitudinal end of the last rail 102 in the plurality of rails 102 (e.g., the second rail 102'), and the method 900 ends at step 926.

Figure 10:
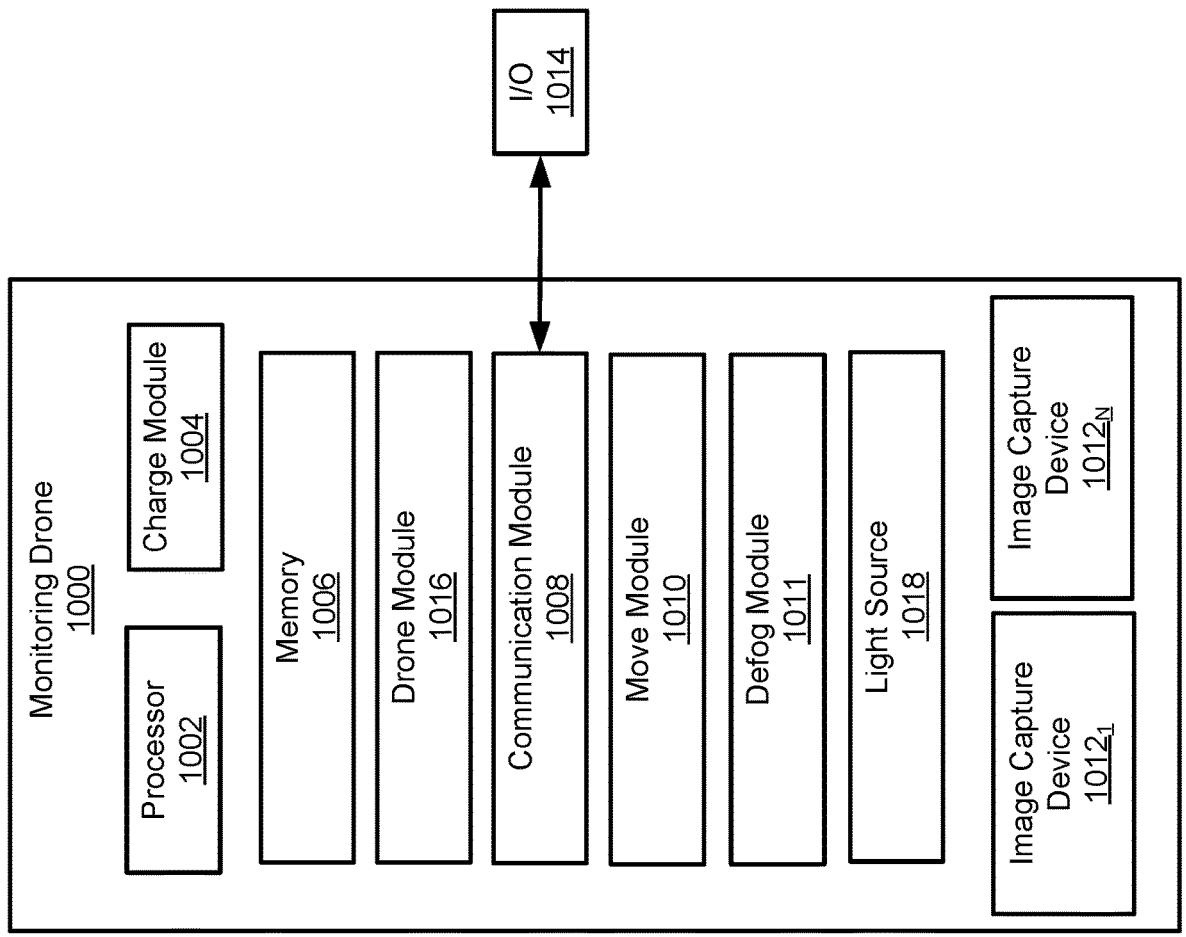
FIG. 10 is a block diagram illustrating an embodiment of an apparatus for a monitoring drone that may be mounted on the system of FIG. 1.

FIG. 10 is a block diagram illustrating an embodiment of an apparatus for a monitoring drone 1000, according to another embodiment. The monitoring drone 1000 is used to monitor products, goods, shoppers, employees, etc. in a facility, such as, a retail store, distribution centers, or any place where goods are available. The monitoring drone 1000 may couple to a shelf, cooler, stand, or any structure capable of holding goods, products, articles, and the like, using the rail track system 100 or mounted in a stationary configuration thereon. Various embodiments of monitoring drones and systems and methods of operating monitoring drones are described in PCT Appl. No. PCT/US2018/045664, filed Aug. 7, 2018 and entitled "System, apparatus and method for a monitoring drone," the entire disclosure of which is hereby incorporated herein by reference.

The monitoring drone 1000 includes a processor (CPU) 1002, a charge module 1004, memory 1006, communication module 1008, move module 1010, a defog module 1011, one or more image capture device 1012 (for example, multiple image capture devices $1012_1$ . . . $1012_N$), input/output devices (I/O) 1014 and a drone module 1016. In some embodiments, the monitoring drone 1000 also includes a light source 1018, such as a flash, Light-Emitting-Diode (LED), and the like.

Memory 1006 may be any combination of one or more computer readable media. The computer readable media may be a computer readable signal medium, any type of memory or a computer readable non-transitory storage medium. For example, a computer readable storage medium may be, but not limited to, an electronic, magnetic, optical, electromagnetic, or semiconductor system, apparatus, or device, or any suitable combination of the foregoing. More specific examples of the computer readable storage medium would include, but are not limited to: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain or store a program for use by or in connection with an instruction execution system, apparatus, or device.

Computer program code for carrying out operations utilizing a processor or CPU 1002 for aspects of the present disclosure may be written in any combination of one or more programming languages, markup languages, style sheets and JavaScript libraries, including but not limited to Windows Presentation Foundation (WPF), HTML/CSS, Node, XAML, and JQuery, C, Basic, *Ada, Python, C++, C#, Pascal, *Arduino, JAVA and the likes. Additionally, operations can be carried out using any variety of compiler available.

The computer program instructions on memory 1006 may be provided to the processor 1002, where the processor 1002 is of a general purpose computer, special purpose computer, microchip or any other programmable data processing apparatus to produce a machine, such that the instructions, which execute via the processor of the computer or other programmable instruction execution apparatus, create a mechanism for implementing the functions/acts specified in the flowchart and/or block diagram block or blocks. The computer instructions may do one or more of the following, run the monitoring drone 1000, and give status or health of the monitoring drone 1000 or the entire system utilizing the monitoring drone 1000. In one embodiment, it may even perform image analysis and/or perform data compression.

These computer program instructions may also be stored in memory 1006 (computer readable medium) that when executed can direct a computer, processor, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, processor, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The charge module 1004 is utilized to power/maintain power to the monitoring drone 1000. The charge module 1004 may be a low power and might be wired or wireless and may utilize one or combination of the following battery, WIFI charging, coil, solar cells, or any other mechanism that provides charge to the monitoring drone 1000. In some embodiments, the charge module 1004 may be in electrical communication with an electrical contact included in a charging portion (e.g., the charging port 114*f*) of the monitoring drone 1000. In such embodiments, the charge module 1004 may be configured to use electrical power provided by the power module of the charge cap 104 when the monitoring drone 1000 is mounted on the rail track system 100 and engages the charge cap 104, as previously described herein.

The communication module 1008 facilitates communication between the monitoring drone 1000 and other devices, computers, networks, cloud, I/O devices 1014, and the likes. The communication module 1008 may include ethernet, USB connection, port connections of various types, wireless, combination thereof and the likes. The communication module 1008 may communicate in real-time, in intervals, on demand or a combination there of.

The move module 1010 facilitates movement about a shelf, cooler, stand, store ceiling, floor and the likes and may utilize any mechanical or electrical mechanism to do so. Some embodiment are further described in FIG. 12 and FIG. 13. The move module 1010, for example, may utilize wheels, motors, pneumatics, magnetics, levitation, etc. The move module 1010 may also provide a coupling mechanism for the monitoring drone 1000 to the shelf, cooler stand and the likes. In one embodiment, the move module 1010 moves the monitoring drone 1100 in a predetermined path or in a path set by the hardware configuration. For example, the monitoring drone 1000 may be mounted on the rail track system 100 and the move module 1010 may be configured to move the monitoring drone 1000 along the track 102b of the rails 102.

In one embodiment, the monitoring drone 1000 may utilize a defog module 1011 to prevent or clear condensation, for example, if placed outdoors, in a cooler, and the like. The defog module 1011 may include electrical mechanism, mechanical mechanism, fluids, combination thereof and the like. The drone module 1011 may also utilize computer instructions in memory 1006 and processed by processor 1002.

The monitoring drone 1000 may utilize the image capture device 1012 or multiple image capture device $1012_1 \ldots 1012_N$. The image capture device 1012 may be one or more of the following a mono-camera, a stereo camera, a video camera, an infrared camera, a Realsense camera, Kinect Camera, Leap camera, a depth camera, a color camera, structured light camera, a combination thereof, and the likes. In one embodiment, multiple image capture device $1012_1 \ldots 1012_N$ are used in a configuration where the image capture device $1012_1 \ldots 1012_N$ may be angled in one or more angle to capture different views. In another embodiment, the multiple image capture devices 1012 communicate to learn location in relation to one another. For example, the image capture device 1012 may communicate with image capture device 1012 on both sides of the shelf or isle. As such, such communication is utilized for mapping of a facility or room mapping using depth, such as, a store, distribution center, etc. As such, the monitoring drone 1000 may be utilized for determining where objects, such as, goods, inventory, individuals, are located within the such a facility. Hence, such a configuration may be used for third parties to determine arrival of items to a facility and to confirm placement. For example, a chips stand-alone cardboard can be remotely verified to confirm arrival, installation and/or location within a store, etc.

In one embodiment, the monitoring drone 1000 may also include a GPS, Beacon Technology or any technology that allows for learning location, including WIFI, Beaker technology, Bluetooth mesh, infrared, etc. In such an embodiment, the monitoring drone 1000 may facilitate way finding, for example, to locate a product in a store etc. The monitoring drone 1000 may also include a display, laser pointer, or any communication facilitator.

The input/output module (I/O) 1014 may be any devices that are used to present, print, receive, store, analyze, transmit, communicate, etc. with the monitoring drone 1000. The I/O 1014 may be coupled wirelessly or with a wire with the monitoring drone 1000. The I/O 1012 may be used to display, analyze, print, sound, etc., images or information relating to the monitoring drone 1000, its surroundings, etc. The I/O 1014 may also transmit information to the monitoring drone 1000, for example, for updates, resets, data retrieval or data inputting, learn vitals, trouble shoot, control various components of the monitoring drone 1000, etc.

In one embodiment, the monitoring drone 1000 is capable of speech recognition and/or display, for example, may include a microphone and/or a speaker. For example, a shopper may ask the monitoring drone 1000 the location of an item. The monitoring drone 1000 may also include a display, for example, an LED display or the likes. In an embodiment where the monitoring drone 1000 can communicate with other monitoring drones 1000, it may inform the monitoring drone 1000 at the location of the question. Using face recognition, the monitoring drone 1000 closer to the location of the item may use a pointer, such as, an infrared or laser pointer to highlight a specific path or location to the shopper. Even when face recognition is not used, the monitoring drone 1000 close to the location can still highlight a location using such technology.

Figure 11:
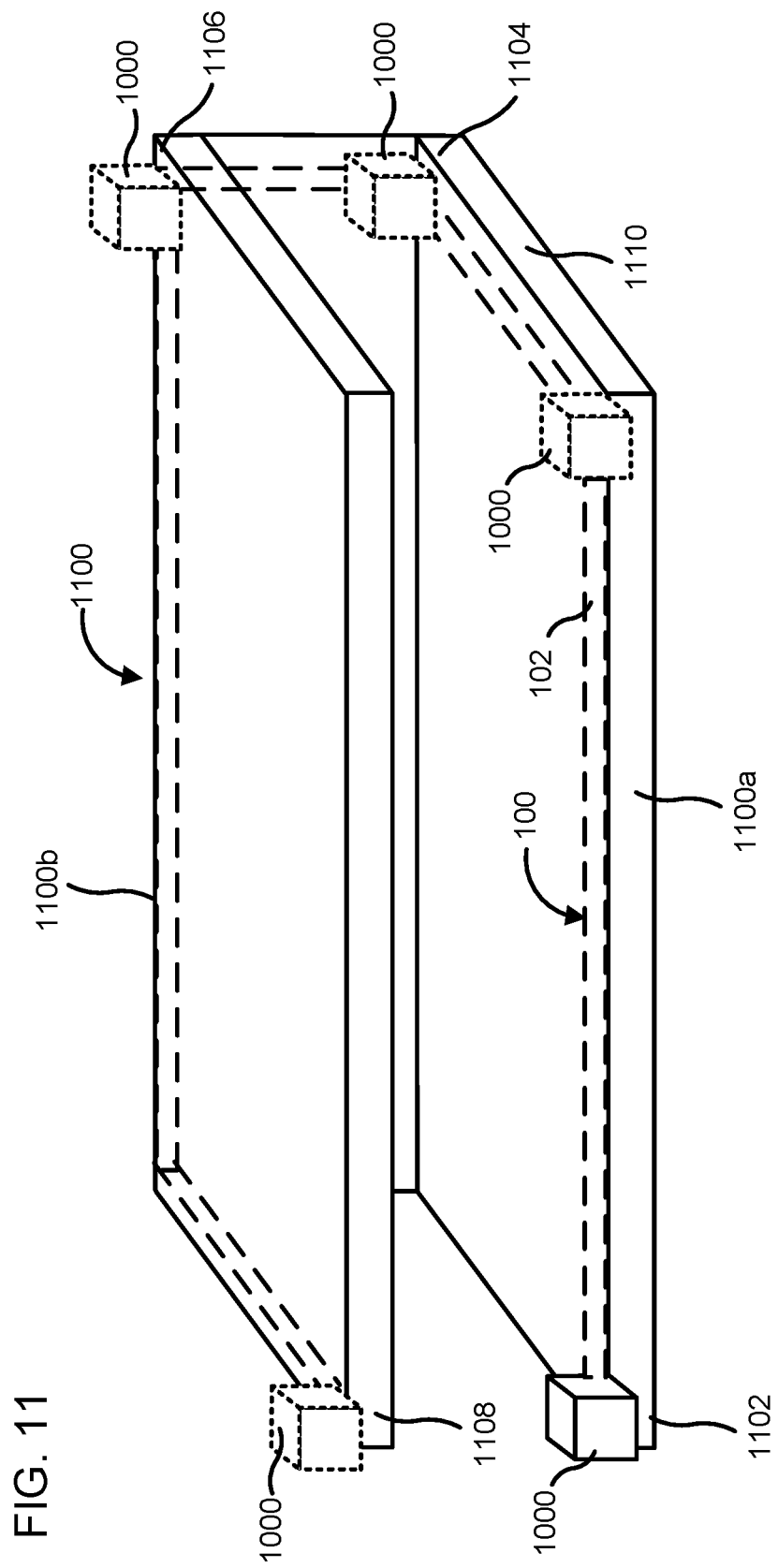
FIG. 11 is a diagram illustrating an embodiment of a monitoring drone configuration for a shelf.

FIG. 11 is an embodiment illustrating a monitoring drone 1000 configuration for a shelf assembly 1100 including a top shelf 1100a and a bottom shelf 1100b. The monitoring drone 1000 maybe placed anywhere around or on the shelf assembly 1100, i.e. around the proximity close to the front bottom 1102, back bottom 1104, back top 1106, front top 1108, and/or the sides 1110 of the shelf assembly 1100. Multiple monitoring drones 1000 maybe placed about the shelf assembly 1100. In one embodiment, the monitoring drone 1000 is placed on a rail 102 of the rail track system 100, on a price channel of the shelf assembly 1100. The rail 102 may be a straight line as shown in FIGS. 1-3. In other embodiments, the rail, C-shape, or any shape needed. The rail 102 may allow the monitoring drone 1000 to move about the shelf 1100 utilizing gear/tooth, magnetic lock, magnetic levitation, etc. In one embodiment, the monitoring drone 1000 moves about the shelf assembly 1100 without a rail 102. Any number of drones 1000 may be placed around or on the shelf 1100.

In one embodiment, the monitoring drone 1000 is coupled to the shelf assembly 1100 to create an "intelligent shelf" without the need for electricity. For example, the monitoring drone 1000 may include a single image capture device 1012 and a low power source, such a battery, being charged by coils or any other wireless charge mechanism. The monitoring drone 1000 moves up and down the edge of the shelf assembly 1100 or the price channel portion if the shelf. The monitoring drone 1000 may be placed within a clear tube to prevent theft or avoid inflicting any harm on those close by as it moves. The image capture device 1012 takes images as it moves, for example, of the shelf assembly 1100 it sits on, a shelf in front of it, a series of shelves around it, or the surrounding of the shelf(s).

The images captured by the monitoring device 1000 may be stitched to form a virtual stereoscopic imagery or vision of the shelf(s) and/or its surroundings. In one embodiment, the images are captures in time or distance intervals to facilitate the stitching of the images into a virtual stereoscopic vision (image). In another embodiment, the images are analyzed and stitched based on common pixels. For example, a mono-camera may be used to produce a virtual stereoscopic image, to create average, to determine depths, etc.

In one embodiment, a virtual mask maybe developed to remove differences between images and to better identify objects being monitored in contrast with objects passing by or introduced for a short term, such as a cart.

In one embodiment, the monitoring drone 1000 may be place at a higher elevation, such as, the upper portion of the shelf assembly 1100 (e.g., on the top shelf 1100b), or may be place at the bottom portion of a shelf assembly 1100 (e.g., the bottom shelf 1100a). The shelf assembly 1100 includes two or more shelves. In yet another embodiment, the image capture device 1012 may be angled up or down to facilitate visibility or to capture a specific view. In one embodiment, the monitoring drone 1000 monitors the shelf assembly 1100 or any other shelf assembly that it is coupled to. In another embodiment, the monitoring drone 1000 monitors a shelf or shelf assembly that is across from its location. As such, the monitoring drone 1000 moves across the rail 102 and captures images of a section of a shelf, an entire shelf, a shelf across the aisle or a shelf assembly across the aisle. All capabilities and setup discussed herein for a shelf is also applicable for a cooler, stand, retail display, distribution facilities, etc.

Figure 12:
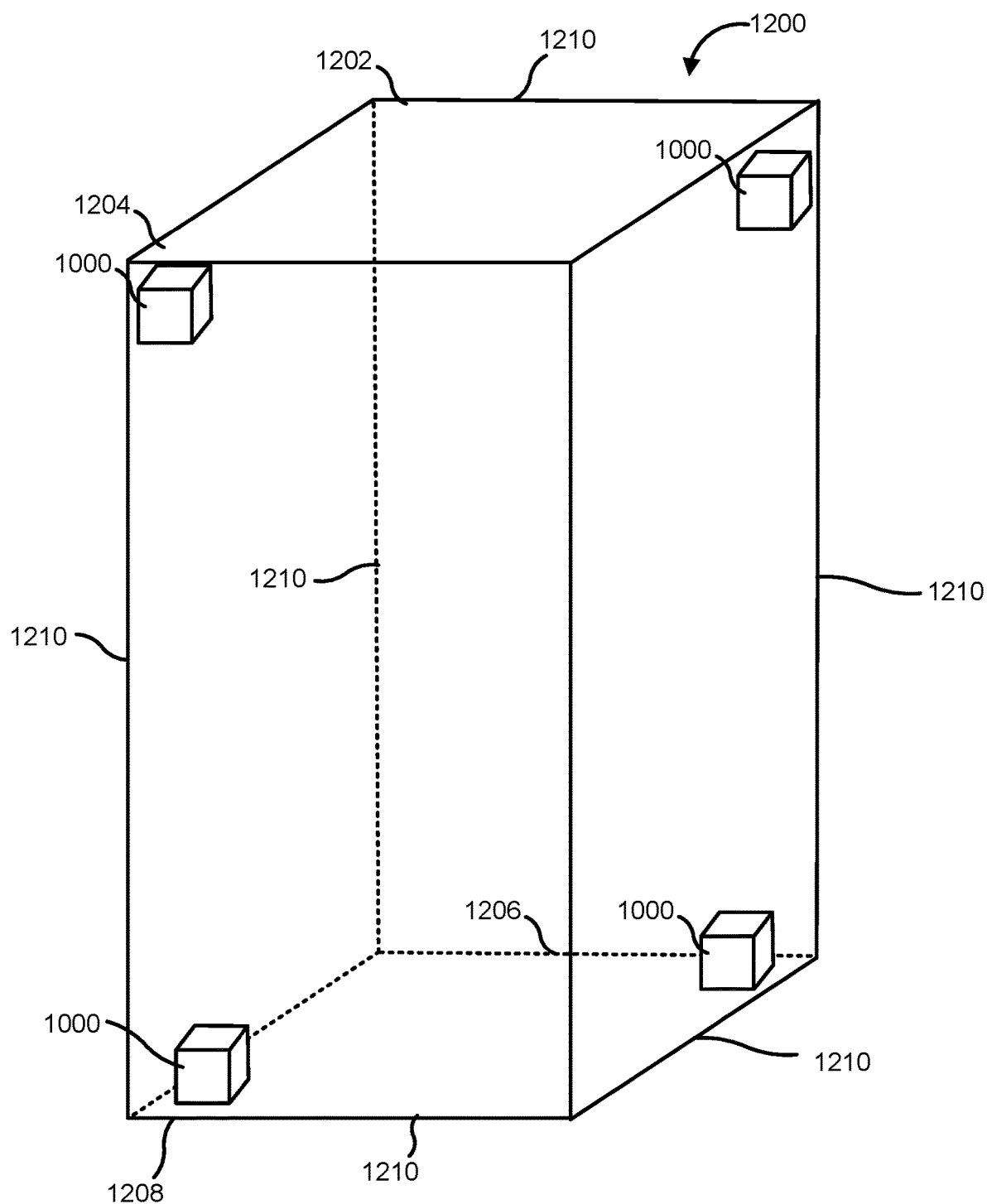
FIG. 12 is a diagram illustrating an embodiment of a monitoring drone configuration for a cooler.

FIG. 12 is an embodiment illustrating a monitoring drone 1000 configuration for a cooler 1200 (e.g., a refrigerator, a vending machine, etc.). The monitoring drone 1000 may be coupled to the cooler 1200 at the top back 1202, top front 1204, bottom back 1206, bottom front 1208, or any sides 1210 of the cooler 200. In some embodiments, a single monitoring drone 1000 may be mounted on a rail track system installed in the cooler 1200.

Figure 13:
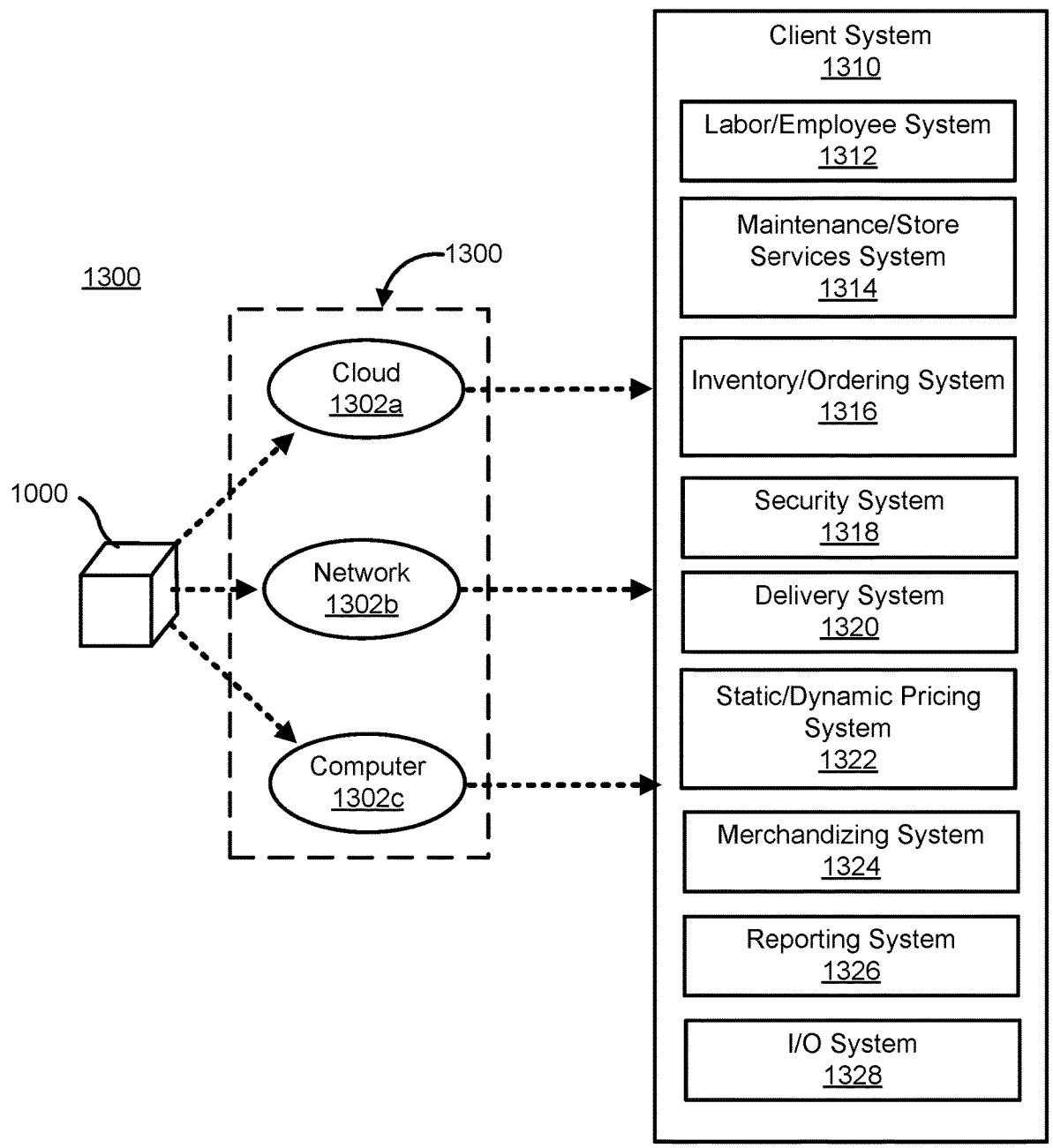
FIG. 13 is a diagram illustrating an embodiment of a monitoring drone system.

FIG. 13 is a diagram illustrating an embodiment of a monitoring drone system 1300. The monitoring drone system 1300 includes a monitoring drone 1000, as described above in FIG. 10, and data system 1302. The data system 1302 may include one or more of a cloud 1302a, a network 1302b, or a computer 1302c (e.g., a main frame, a personal computer, a laptop, a tablet, a mobile phone, etc.) and the like. In FIG. 13, and by way of example, the cloud 1302a, network 1302b, and the personal computer 1302c are illustrated. The data system 1302 may be coupled to the monitoring drone 1000 wirelessly or with a wire. The data system 1302 receives data and/or images from the monitoring drone 1000. The data system 1302 is capable of performing analysis on the images received to determine if an item in the image is to be monitored or if it is an item that is temporarily in the image and, thus, does not require monitoring.

The data system 1302 is capable of performing analysis on an image and provide analytical data to one or more of systems of a client system 1310 (e.g., a central inventory management system or a retailer) such as, for example, a labor/employee systems 1312, a maintenance/store services system 1314, an inventory/ordering system 1316, a security system 1318, a delivery system 1320, a static/dynamic pricing system 1322 (in some cases for dynamic pricing), a merchandizing system 1324, reporting/analytics system 1326, and/or an I/O system 1328, for example, a display or audio/visual devices included in the client system 1310 that may generate alarms/alerts. In one embodiment, some of the data system 1302 functionality may be performed by the monitoring drone 1000.

For example, the monitoring drone 1000 travels across the pricing channel of the shelf assembly 1100 utilizing the rail track system 100. The image capture device 1012 of the drone 1000 capture images of products or inventory on the shelf assembly 1100. The communication module 1008 transmits the images to the data system 1302. The data system 1302 analyzes the difference between the images and, accordingly, determines one or more of the following: items consistently in the image (products on a shelf), items in the image for a short term (i.e. customer walking by), items in the image for a long term but not consistently (i.e. a cart left behind). Such determination may be concluded utilizing depth information, time duration, and/or combination thereof. In one embodiment, the communication module 1008 facilitates communication with mobile devices, other image capture device(s), retailers, shoppers, inventory stockers, etc.

As such, if the data system 1302 determines that an item is left behind, a message may be transmitted to an alert system or employees' mobile devices, etc. However, the data system 1302 may determine the item is consistently in the image and identify it as a product. And thus, if the product depth changes over time, then inventory change is noted and other systems (e.g., the inventory/ordering system 1316, the delivery system 1320, the merchandizing system 1324, the reporting/analytics system 1326, etc.) may be notified to account for the inventory change, request the shelf be replenished, determine consumer habits in purchasing, etc. In another embodiment, the data system 1302 determines that an item is there for a short time because a shopper walked in the view of the image capture device 1012. In such case, the data related to the shopper may be used for face recognition, merchandizing, planograms, or may be ignored. In yet another embodiment, the drone monitoring system 1300 may be utilized to determine employee efficiency, effectiveness in maintaining proper product shelving, etc.

The drone monitoring system 1300 is capable of determining spacing between products and may use triangulation/depth to determine if items are placed or missing within a distance threshold (item further from threshold may mean empty spot on a shelf whereas item closer from distance threshold may mean object in isle, etc.). A distance threshold may be a set distance, a range, and/or learned over time by the drone monitoring system 1300. Its analysis may be used to determine one or more of the following: recognize products, product description, product location, product location accuracy (planogram), product amount (number), product amount above or below a threshold, need for price change, price accuracy, security issues, facial recognition, buyers' habits, etc.

Figure 14:
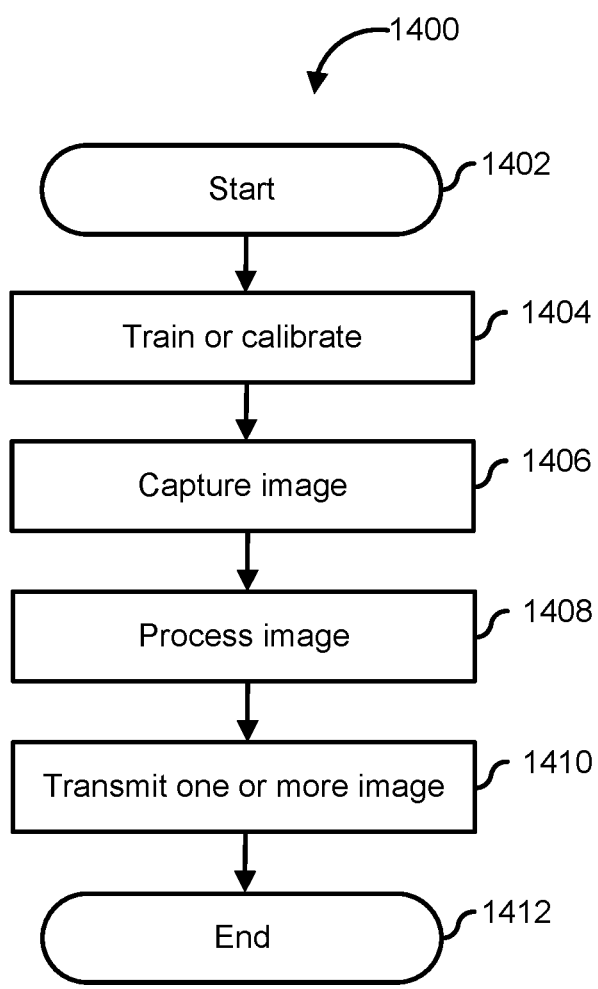
FIG. 14 is a flow diagram illustrating an embodiment of a drone monitoring method.

FIG. 14 is a schematic flow diagram illustrating an embodiment of a drone monitoring method 1400. The method starts at step 1402 and proceeds to step 1404. At step 1404, the method 1400 calibrates and/or trains the monitoring drone (e.g., the monitoring drone 114, 1000) to be ready to perform one or more of its functions, such as, the monitoring drone may calibrate its image capture device (e.g., the image capture device 114a, 1012), determines the products it is monitoring, learns or receives data relating to the product type, its representation, its location on a shelf, its location in a store, metadata related to the product or store, time/date setting, movement calibration, communication handshaking, etc.

Next, at step 1406, the method 1400 captures images as it moves around and then processes the image at step 1408. In one embodiment, the processing of the image may be archiving the image to memory and/or preparing the image to be transmitted. In another embodiment, at step 1406, the method 1400 may determine the validity, quality and/or categorize an image. In yet another embodiment, the image may be analyzed to provide monitoring data based on image content analysis. At step 1410, the method 1400 transmits images and/or data and the method ends at step 1412.

Even though all these items are shown to be in the same drone monitoring system 1300, yet, they may be distributed in multiple systems that may or may not be in the same location. In one embodiment, images and/or data is communicated to a cloud system.

In some embodiments, a rail track assembly comprises: a rail defining a longitudinal channel configured to slidably receive at least a portion of a monitoring drone; an end cap configured to be coupled to a first longitudinal end of the rail; and a charge cap configured to be coupled to second longitudinal end of the rail opposite the first longitudinal end, the charge cap configured to house a power module for charging the monitoring drone when the monitoring drone is located at the second longitudinal end.

In some embodiments, the charge cap comprises: a charge cap main body configured to abut an end face of the second longitudinal end of the rail when the charge cap is coupled to the rail; and a power module housing extending from the charge cap main body into the longitudinal channel, the power module housing configured to house the power module. In some embodiments, the charge cap further comprises at least one charging portion that includes at least one charging pin protruding therefrom into the longitudinal channel of the second rail, the at least one charging pin configured to contact a charging port of the monitoring drone so as to charge the monitoring drone. In some embodiments, a plurality of slots are defined at a first longitudinal end and the second longitudinal end of the rail; and the charge cap comprises a plurality of charge cap tabs extending from the charge cap main body towards the rail, each of the plurality of charge cap tabs configured to be inserted into a corresponding slot of the plurality of slots for coupling the charge cap to the second longitudinal end of the rail.

In some embodiments, the end cap defines a plurality of end cap tabs extending from the end cap towards the rail, each of the plurality of end cap tabs configured to be inserted into a corresponding slot of the plurality of slots for coupling the end cap to the first longitudinal end of the rail. In some embodiments, the rail defines at least one track extending along a longitudinal length of the rail and configured to slidably mount the monitoring drone. In some embodiments, the rail track assembly further comprises a rail holder defining a receptacle configured to hold the rail, the rail holder configured to be coupled to a structure so as to secure the rail to the structure. In some embodiments, the receptacle defines a perimetral shape that corresponds to an outer perimetral shape of the rail. In some embodiments, each of the perimetral shape of the receptacle and the outer perimetral shape of the rail comprise a C-shape, the C-shape facilitating rotation of the rail within the receptacle so as to allow positioning of the rail within the receptacle in a desired orientation.

In some embodiments, a rail track system, comprises: a first rail and a second rail, each of the first rail and the second rail defining a longitudinal channel configured to slidably receive at least a portion of a monitoring drone; an end cap configured to be coupled to a first longitudinal end of the first rail; a rail coupler configured to couple a second longitudinal end of the first rail opposite the first longitudinal end to a first longitudinal end of the second rail, thereby coupling the first rail to the second rail; and a charge cap configured to be coupled to a second longitudinal end of the second rail opposite the first longitudinal end of the second rail, the charge cap configured to house a power module for charging the monitoring drone when the monitoring drone is located at the second longitudinal end of the second rail.

In some embodiments, the charge cap comprises: a charge cap main body configured to abut an end face of the second longitudinal end of the second rail when the charge cap is coupled to the second rail; and a power module housing extending from the charge cap main body into the longitudinal channel of the second rail, the power module housing configured to house a power module. In some embodiments, the charge cap further comprises at least one charging portion that includes at least one charging pin protruding therefrom into the longitudinal channel of the second rail, the at least one charging pin configured to contact a charging port of the monitoring drone so as to charge the monitoring drone.

In some embodiments, a plurality of slots are defined at the respective first longitudinal end the second longitudinal end of each of the first rail and the second rail; and the charge cap comprises a plurality of charge cap tabs extending from the charge cap main body towards the second rail, each of the plurality of charge cap tabs configured to be inserted into a corresponding slot of the plurality of slots of the second rail for coupling the charge cap to the second longitudinal end of the second rail. In some embodiments, the end cap defines a plurality of end cap tabs extending from the end cap towards the rail, each of the plurality of end cap tabs configured to be inserted into a corresponding slot of the plurality of slots defined on the first longitudinal end of the first rail for coupling the end cap to the first longitudinal end of the first rail.

In some embodiments, each of the first rail and the second rail defines at least one track extending along their respective longitudinal lengths, the track configured to slidably mount the monitoring drone. In some embodiments, the rail track system further comprises: a plurality of rail holders, each of the plurality of rail holders defining a receptacle configured to hold the first rail or the second rail, the plurality of rail holders configured to be coupled to a structure so as to secure the first rail or the second rail to the structure. In some embodiments, the receptacle defines a perimetral shape that corresponds to an outer perimetral shape of the first rail and the second rail. In some embodiments, each of the perimetral shape of the receptacle and the outer perimetral shape of the first rail and the second rail comprise a C-shape, the C-shape facilitating rotation of the first rail and the second rail within the corresponding receptacle so as to allow positioning of the first rail and the second rail within the corresponding receptacle in a desired orientation. In some embodiments, the rail coupler comprises a sleeve that encompasses at least a portion of the first rail and the second rail.

In some embodiments, a method for mounting a monitoring drone on a structure, comprises: coupling one or more rail holders to the structure, each of the one or more rail holders defining a receptacle; positioning a rail in the receptacle of a corresponding rail holder of the one or more rail holders so as to couple a desired number of rails to the structure, each of the rails defining a longitudinal channel configured to slidably receive at least a portion of the monitoring drone; mounting a monitoring drone on a rail of the desired number of rails; coupling an end cap to a first longitudinal end of a first rail of the desired number of rails; and coupling a charge cap to a second longitudinal end of a last rail of the desired number of rails, the charge cap configured to house a power module for charging the monitoring drone when the monitoring drone is located at the second longitudinal end of the last rail that is opposite the first longitudinal end of the first rail.

In some embodiments, the method further comprises: prior to mounting the monitoring drone on the rail, determining if rotation is needed to align one or more of the rails with an adjacent rail; in response to determining that rotation is needed, rotating the one or more rails; and coupling the one or more rail with the adjacent rail via a rail coupler.

It will be appreciated by those skilled in the art that changes could be made to the embodiments described above without departing from the broad inventive concept. It is understood, therefore, that this disclosure is not limited to the particular embodiments herein, but it is intended to cover modifications within the spirit and scope of the present disclosure as defined by the appended claims.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another.

Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A rail track assembly, comprising:
   a rail defining a longitudinal channel configured to receive at least a portion of a monitoring drone for movement therein;
   an end cap coupled to a first longitudinal end of the rail; and
   a charge cap coupled to second longitudinal end of the rail opposite the first longitudinal end, the charge cap including a power module for charging the monitoring drone when the monitoring drone is located at the second longitudinal end.

2. The rail track assembly of claim 1, wherein the charge cap comprises:
   a charge cap main body configured to abut an end face of the second longitudinal end of the rail when the charge cap is coupled to the rail; and
   a power module housing extending from the charge cap main body into the longitudinal channel, the power module housing configured to house the power module.

3. The rail track assembly of claim 2, wherein the charge cap further comprises at least one charging portion that includes at least one charging pin protruding therefrom into the longitudinal channel of the second rail, the at least one charging pin configured to contact a charging port of the monitoring drone so as to charge the monitoring drone.

4. The rail track assembly of claim 2, wherein:
   a plurality of slots are defined at a first longitudinal end and the second longitudinal end of the rail; and
   the charge cap comprises a plurality of charge cap tabs extending from the charge cap main body towards the rail, each of the plurality of charge cap tabs configured to be inserted into a corresponding slot of the plurality of slots for coupling the charge cap to the second longitudinal end of the rail.

5. The rail track assembly of claim 4, wherein the end cap defines a plurality of end cap tabs extending from the end cap towards the rail, each of the plurality of end cap tabs configured to be inserted into a corresponding slot of the plurality of slots for coupling the end cap to the first longitudinal end of the rail.

6. The rail track assembly of claim 1, wherein the rail defines at least one track extending along a longitudinal length of the rail and configured to slidably mount the monitoring drone.

7. The rail track assembly of claim 1, further comprising:
   a rail holder defining a receptacle configured to hold the rail, the rail holder configured to be coupled to a structure so as to secure the rail to the structure.

8. The rail track assembly of claim 7, wherein the receptacle defines a perimetral shape that corresponds to an outer perimetral shape of the rail.

9. The rail track assembly of claim 8, wherein each of the perimetral shape of the receptacle and the outer perimetral shape of the rail comprise a C-shape, the C-shape facilitating rotation of the rail within the receptacle so as to allow positioning of the rail within the receptacle in a desired orientation.

10. A rail track system, comprising:
    a first rail and a second rail, each of the first rail and the second rail defining a longitudinal channel configured to slidably receive at least a portion of a monitoring drone;
    an end cap configured to be coupled to a first longitudinal end of the first rail;
    a rail coupler configured to couple a second longitudinal end of the first rail opposite the first longitudinal end to a first longitudinal end of the second rail, thereby coupling the first rail to the second rail; and
    a charge cap configured to be coupled to a second longitudinal end of the second rail opposite the first longitudinal end of the second rail, the charge cap configured to house a power module for charging the monitoring drone when the monitoring drone is located at the second longitudinal end of the second rail.

11. The rail track system of claim 10, wherein the charge cap comprises:
    a charge cap main body configured to abut an end face of the second longitudinal end of the second rail when the charge cap is coupled to the second rail; and
    a power module housing extending from the charge cap main body into the longitudinal channel of the second rail, the power module housing configured to house a power module.

12. The rail track system of claim 11, wherein the charge cap further comprises at least one charging portion that includes at least one charging pin protruding therefrom into the longitudinal channel of the second rail, the at least one charging pin configured to contact a charging port of the monitoring drone so as to charge the monitoring drone.

13. The rail track system of claim 10, wherein:
- a plurality of slots are defined at the respective first longitudinal end the second longitudinal end of each of the first rail and the second rail; and
- the end cap defines a plurality of end cap tabs extending from the end cap towards the rail, each of the plurality of end cap tabs configured to be inserted into a corresponding slot of the plurality of slots defined on the first longitudinal end of the first rail for coupling the end cap to the first longitudinal end of the first rail.

14. The rail track system of claim 10, wherein the each of the first rail and the second rail defines at least one track extending along their respective longitudinal lengths, the track configured to slidably mount the monitoring drone.

15. The rail track system of claim 10, further comprising:
- a plurality of rail holders, each of the plurality of rail holders defining a receptacle configured to hold the first rail or the second rail, the plurality of rail holders configured to be coupled to a structure so as to secure the first rail or the second rail to the structure.

16. The rail track system of claim 15, wherein the receptacle defines a perimetral shape that corresponds to an outer perimetral shape of the first rail and the second rail.

17. The rail track system of claim 16, wherein each of the perimetral shape of the receptacle and the outer perimetral shape of the first rail and the second rail comprise a C-shape, the C-shape facilitating rotation of the first rail and the second rail within the corresponding receptacle so as to allow positioning of the first rail and the second rail within the corresponding receptacle in a desired orientation.

18. The rail track system of claim 10, wherein the rail coupler comprises a sleeve that encompasses at least a portion of the first rail and the second rail.

19. A method for mounting a monitoring drone on a structure, comprising:
- coupling one or more rail holders to the structure, each of the one or more rail holders defining a receptacle;
- positioning a rail in the receptacle of a corresponding rail holder of the one or more rail holders so as to couple a desired number of rails to the structure, each of the rails defining a longitudinal channel configured to slidably receive at least a portion of the monitoring drone;
- mounting a monitoring drone on a track of the desired number of rails;
- coupling an end cap to a first longitudinal end of a first rail of the desired number of rails; and
- coupling a charge cap to a second longitudinal end of a last rail of the desired number of rails, the charge cap configured to house a power module for charging the monitoring drone when the monitoring drone is located at the second longitudinal end of the last rail that is opposite the first longitudinal end of the first rail.

20. The method of claim 19, further comprising:
- prior to mounting the monitoring drone on the rail, determining if rotation is needed to align one or more of the rails with an adjacent rail;
- in response to determining that rotation is needed, rotating the one or more rails; and
- coupling the one or more rail with the adjacent rail via a rail coupler.

\* \* \* \* \*